(12) United States Patent
Pesala et al.

(10) Patent No.: US 12,354,266 B2
(45) Date of Patent: Jul. 8, 2025

(54) FLUORESCENCE-BASED DETECTION OF PROBLEMATIC CELLULAR ENTITIES

(71) Applicant: ADIUVO DIAGNOSTICS PRIVATE LIMITED, Chennai (IN)

(72) Inventors: Bala Pesala, Chennai (IN); Geethanjali Radhakrishnan, Chennai (IN); Bikki Kumar Sha, Chennai (IN); John King, Chennai (IN)

(73) Assignee: ADIUVO DIAGNOSTICS PRIVATE LIMITED, Chennai (IN)

( * ) Notice: Subject to any disclaimer, the term of this patent is extended or adjusted under 35 U.S.C. 154(b) by 0 days.

(21) Appl. No.: 18/767,169

(22) Filed: Jul. 9, 2024

(65) Prior Publication Data

US 2024/0362781 A1 Oct. 31, 2024

Related U.S. Application Data

(63) Continuation of application No. 18/487,438, filed on Oct. 16, 2023, now Pat. No. 12,094,117, which is a
(Continued)

(30) Foreign Application Priority Data

Feb. 9, 2021 (IN) .............................. 202141005558

(51) Int. Cl.
*G06T 7/00* (2017.01)
*G01N 21/64* (2006.01)
(Continued)

(52) U.S. Cl.
CPC .............. *G06T 7/0012* (2013.01); *G06T 7/50* (2017.01); *G06V 10/17* (2022.01); *G06V 10/60* (2022.01);
(Continued)

(58) Field of Classification Search
CPC ..................... G06T 7/0012; G06T 7/50; G06T 2207/10064; G06T 2207/20081;
(Continued)

(56) References Cited

U.S. PATENT DOCUMENTS

2006/0008866 A1 1/2006 Flick et al.
2011/0117025 A1 5/2011 Dacosta et al.
(Continued)

FOREIGN PATENT DOCUMENTS

WO 2020159913 A1 8/2020
WO 2020/210746 A1 10/2020

OTHER PUBLICATIONS

Bonah et al., Application of Hyperspectral Imaging as a Nondestructive Technique for Foodborne Pathogen Detection and Characterization, Foodborne Pathogens and Disease, vol. 16, No. 10, pp. 712-722, 2019.
(Continued)

*Primary Examiner* — Jon Chang
(74) *Attorney, Agent, or Firm* — Cozen O'Connor

(57) ABSTRACT

Techniques are for detecting presence of a problematic cellular entity in a target. In an example, using an analysis model, a fluorescence-based image is analyzed. The analysis model is trained using a number of reference fluorescence-based images for detecting the presence of problematic cellular entities in targets. Based on the analysis, a problematic cellular entity present in the target is detected. To perform the detection, the analysis model is trained to differentiate between the fluorescence in the fluorescence-based image emerging from the problematic cellular entity and the fluorescence in the fluorescence-based image emerging from regions other than the problematic cellular entity.

29 Claims, 32 Drawing Sheets

```
                ┌─ 1500
                ▼
┌─────────────────────────────────────────────────────────┐
│ ILLUMINATING THE TARGET USING A LIGHT SOURCE OF A       │
│ DEVICE, WHEREIN LIGHT EMITTED BY THE LIGHT SOURCE ON    │
│ THE TARGET IS IN A WAVELENGTH BAND TO CAUSE A MARKER    │
│ IN THE TARGET, WHEN ILLUMINATED, TO FLUORESCE, WHEREIN  │
│ THE DEVICE COMPRISES THE LIGHT SOURCE, AN IMAGE SENSOR, │
│ AND A TARGET, WHEREIN THE IMAGE SENSOR IS TO DIRECTLY   │
│ RECEIVE LIGHT EMITTED BY THE TARGET IN RESPONSE TO THE  │
│ ILLUMINATION THEREOF BY THE LIGHT SOURCE, AND TO        │
│ CAPTURE A FLUORESCENCE-BASED IMAGE FORMED BASED ON      │
│ THE LIGHT EMITTED, WHEREIN THE FLUORESCENCE-BASED IMAGE │
│ COMPRISES FLUORESCENCE EMERGING FROM THE TARGET 1502    │
└─────────────────────────────────────────────────────────┘
                ▼
┌─────────────────────────────────────────────────────────┐
│ ANALYSING, BY THE PROCESSOR, USING AN ANALYSIS MODEL,   │
│ THE FLUORESCENCE-BASED IMAGE, WHEREIN THE ANALYSIS      │
│ MODEL IS TRAINED USING A PLURALITY OF REFERENCE         │
│ FLUORESCE-BASED IMAGES FOR DETECTING THE PRESENCE OF    │
│ PROBLEMATIC CEULLULAR ENTITIES IN TARGETS 1504          │
└─────────────────────────────────────────────────────────┘
                ▼
┌─────────────────────────────────────────────────────────┐
│ DETECTING, BASED ON THE ANALYSIS, BY THE PROCESSOR,     │
│ PRESENCE OF A PROBLEMATIC CELLULAR ENTITY IN THE        │
│ TARGET, WHEREIN, TO PERFORM THE DETECTION, THE ANALYSIS │
│ MODEL IS TRAINED TO DIFFERENTIATE BETWEEN THE           │
│ FLUORESCENCE IN THE FLUORESCENCE-BASED IMAGE EMERGING   │
│ FROM THE PROBLEMATIC CELLULAR ENTITY AND FLUORESCENCE   │
│ IN THE FLUORESCENCE-BASED IMAGE EMERGING FROM REGIONS   │
│ OTHER THAN THE PROBLEMATIC CELLULAR ENTITY 1506         │
└─────────────────────────────────────────────────────────┘
```

Related U.S. Application Data continuation of application No. 17/827,399, filed on May 27, 2022, now Pat. No. 11,830,190, which is a continuation of application No. PCT/IN2022/050107, filed on Feb. 8, 2022.

(51) Int. Cl.

| | | |
|---|---|---|
| *G06T 7/50* | (2017.01) | |
| *G06V 10/10* | (2022.01) | |
| *G06V 10/60* | (2022.01) | |
| *G06V 10/82* | (2022.01) | |

(52) U.S. Cl.
CPC ......... *G06V 10/82* (2022.01); *G01N 21/6486* (2013.01); *G06T 2207/10064* (2013.01); *G06T 2207/20081* (2013.01); *G06T 2207/20084* (2013.01); *G06T 2207/30024* (2013.01); *G06T 2207/30088* (2013.01); *G06V 2201/03* (2022.01); *G06V 2201/07* (2022.01)

(58) Field of Classification Search
CPC . G06T 2207/20084; G06T 2207/30024; G06T 2207/30088; G06V 10/17; G06V 10/60; G06V 10/82; G06V 2201/03; G06V 2201/07; G01N 21/6486; G01N 2021/174; G01N 2201/0221; G01N 2201/1296; G01N 21/6456; G06N 3/08; G06N 5/01; G06N 7/01; G06N 20/10; G06N 20/20
See application file for complete search history.

(56) References Cited

U.S. PATENT DOCUMENTS

| | | |
|---|---|---|
| 2014/0267672 A1 | 9/2014 | Morrison et al. |
| 2015/0287191 A1 | 10/2015 | Koruga et al. |
| 2019/0187048 A1 | 6/2019 | Wood et al. |
| 2020/0330028 A1 | 10/2020 | Nejati |
| 2020/0364862 A1* | 11/2020 | DaCosta ................... G06T 7/44 |
| 2021/0106231 A1 | 4/2021 | Radhakrishnan et al. |
| 2021/0228083 A1 | 7/2021 | Strasfeld |
| 2021/0400211 A1* | 12/2021 | Galitz .................. A61B 5/0075 |
| 2022/0061671 A1* | 3/2022 | Dacosta ............. G01N 21/6456 |
| 2022/0099578 A1 | 3/2022 | Majumdar et al. |
| 2022/0240786 A1 | 8/2022 | Subhash et al. |
| 2022/0292677 A1 | 9/2022 | Pesala et al. |

OTHER PUBLICATIONS

Choi et al., Cell Analysis System Using a Filter-Free Fluorescence Sensor. 19th International Conference on Solid-State Sensors, Actuators and Microsystems (Transducers), Jun. 18, 2017, pp. 198-201 (Year: 2017).

International Search Report and Written Opinion mailed on May 27, 2022 in International Application No. PCT/IN2022/050107.

Nakazawa et al., A Filter-less Multi-Wavelength Fluorescence Detector. 16th International Solid-State Sensors, Actuators and Microsystems Conference, Jun. 5, 2011, pp. 100-103 (Year: 2011 ).

Tanaka et al., Realization of Filter-Free Fluorescence Image Sensor. 19th Internal Conference on Solid-State Sensors, Actuators and Microsystems (Transducers), Jun. 18, 2017, pp. 1616-1619 (Year: 2017).

Supplementary European Search Report for EP Patent Application No. 22752470 dated Jun. 19, 2024, 6 pages.

Kong Weichao et al: "Solution 1-Classification With Portable Smartphone-Based Spectrometer System Under 20,22 Variant Shooting Conditions by Using Convolutional Neural Network", IEEE Sensors Journal, IEEE, USA, vol. 20, No. 15, (Mar. 27, 2020), pp. 8789-8796.

* cited by examiner

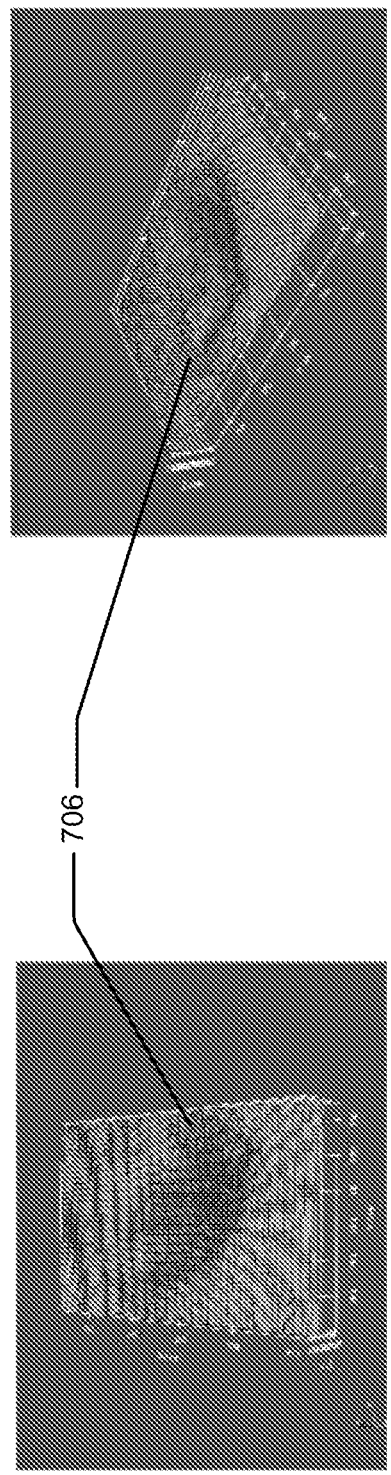

FLUORESCENCE-BASED DETECTION OF PROBLEMATIC CELLULAR ENTITIES

PRIORITY AND CROSS REFERENCE TO RELATED APPLICATIONS

This application is a Continuation Application of U.S. application Ser. No. 18/487,438, filed Oct. 16, 2023, which is continuation Application of U.S. application Ser. No. 17/827,399, filed May 27, 2022, which is a Continuation Application of International Application No. PCT/IN2022/050107, filed Feb. 8, 2022, which claims the benefit of Indian Patent Application No. IN 202141005558, filed Feb. 9, 2021. Any and all applications for which a foreign or a domestic priority is claimed is/are identified in the Application Data Sheet filed herewith and is/are hereby incorporated by reference in their entireties under 37 C.F.R. § 1.57.

TECHNICAL FIELD

The present subject matter relates, in general, to detection of problematic cellular entities, such as pathogens, in targets, and, in particular, to detection of problematic cellular entities based on fluorescence emitted by the problematic cellular entities.

BACKGROUND

A cellular entity may be an entity made of one or more biological cells, such as unicellular organisms, multicellular organisms, tissues, or the like. A problematic cellular entity may be one that may cause harm to plant, animal, or human health. Example of a problematic cellular entity is a pathogen that causes a disease in human beings and a pathogen that delays healing of a wound. A problematic cellular entity may be one that is indicative of an ailment in a plant, animal, or human being. For example, a cancerous tissue may be a problematic cellular entity, which indicates the presence of tumor. The presence of a problematic cellular entity on a target, such as a human body or an edible product, is to be detected, for example, to prevent the occurrence of a disease, to render a person free of a disease, and the like.

BRIEF DESCRIPTION OF DRAWINGS

The features, aspects, and advantages of the present subject matter will be better understood with regard to the following description and accompanying figures. The use of the same reference number in different figures indicates similar or identical features and components.

FIG. 7(b) illustrates a fluorescence image of a human leg superimposed on the 3D image of the wound, in accordance with an implementation of the present subject matter;

DETAILED DESCRIPTION

Figure 1:
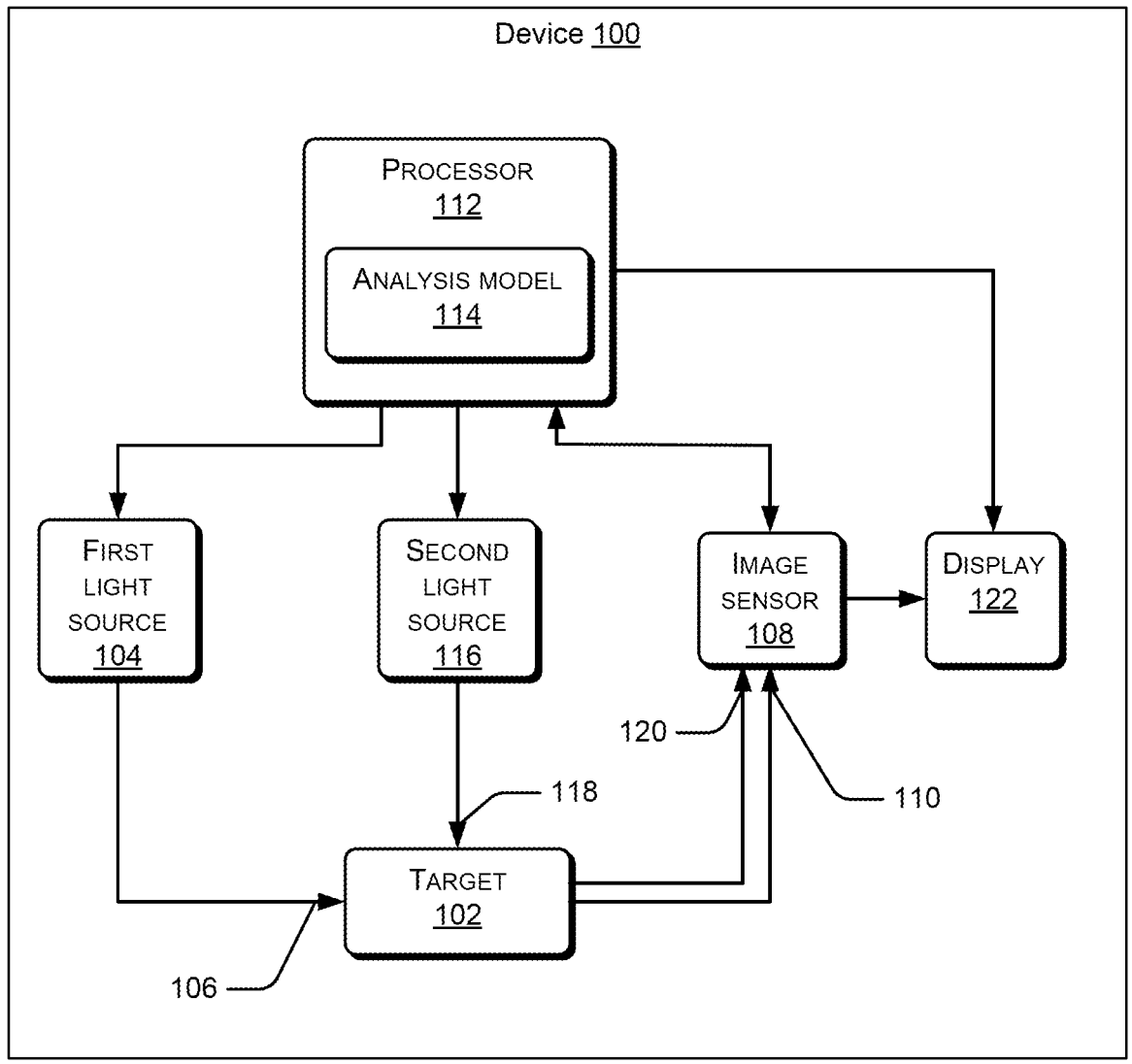
FIG. 1 illustrates a device for examining a target, in accordance with an implementation of the present subject matter.
Figure 2A:
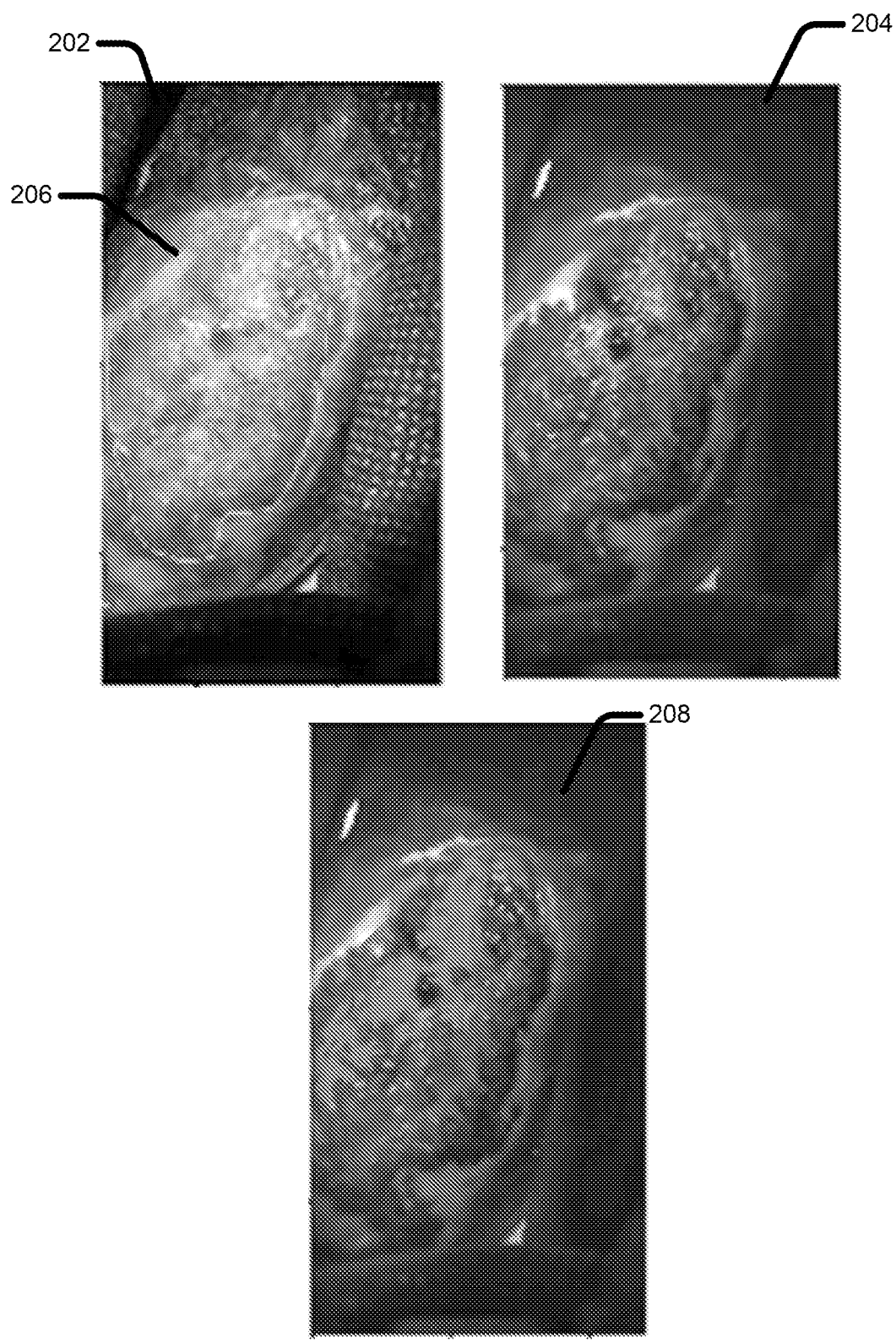
FIGS. 2(a)-2(i) illustrate reference image sets that may be used for training an artificial neural network (ANN) model of an analysis model, in accordance with an implementation of the present subject matter.
Figure 2B:
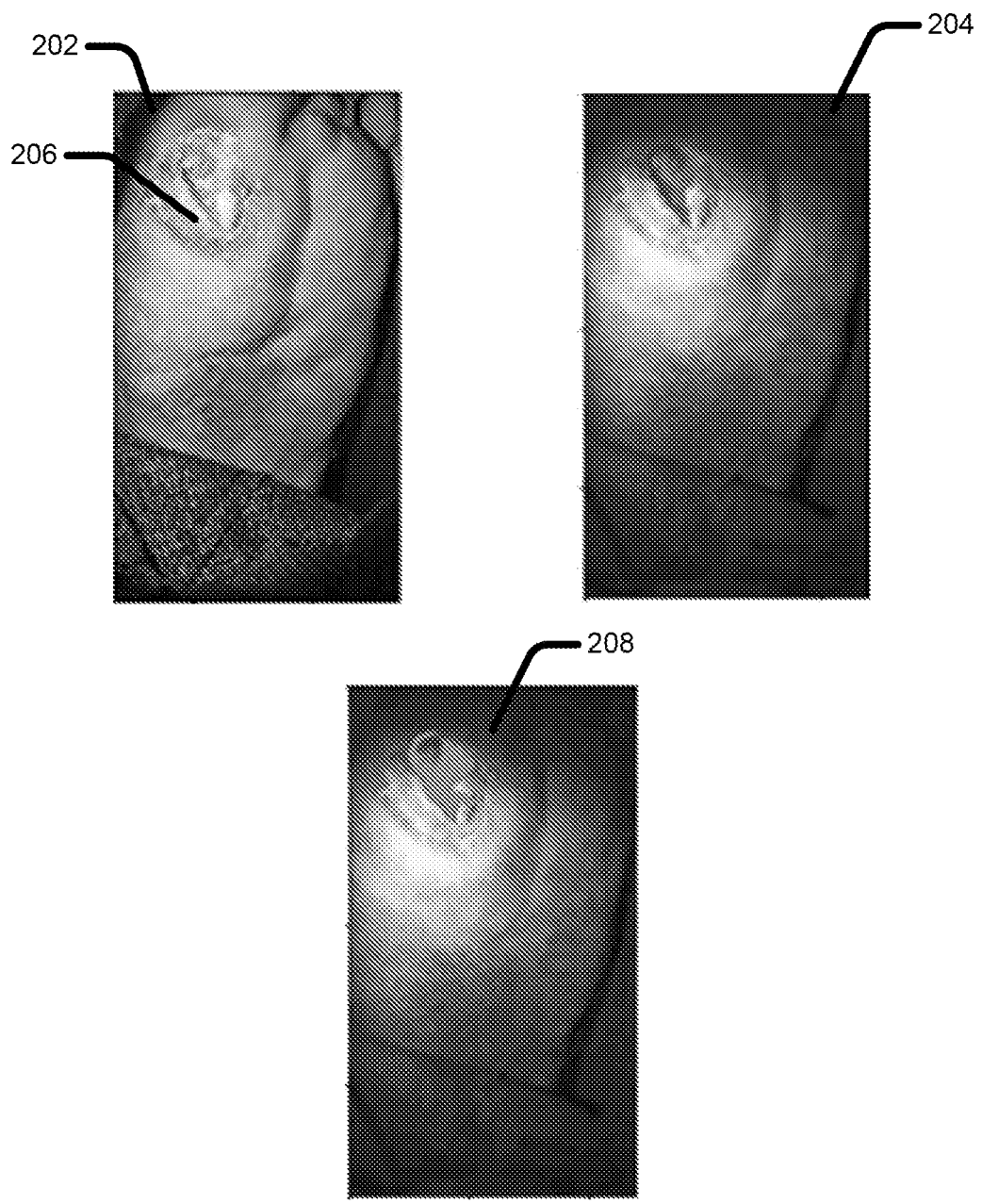
Figure 2C:
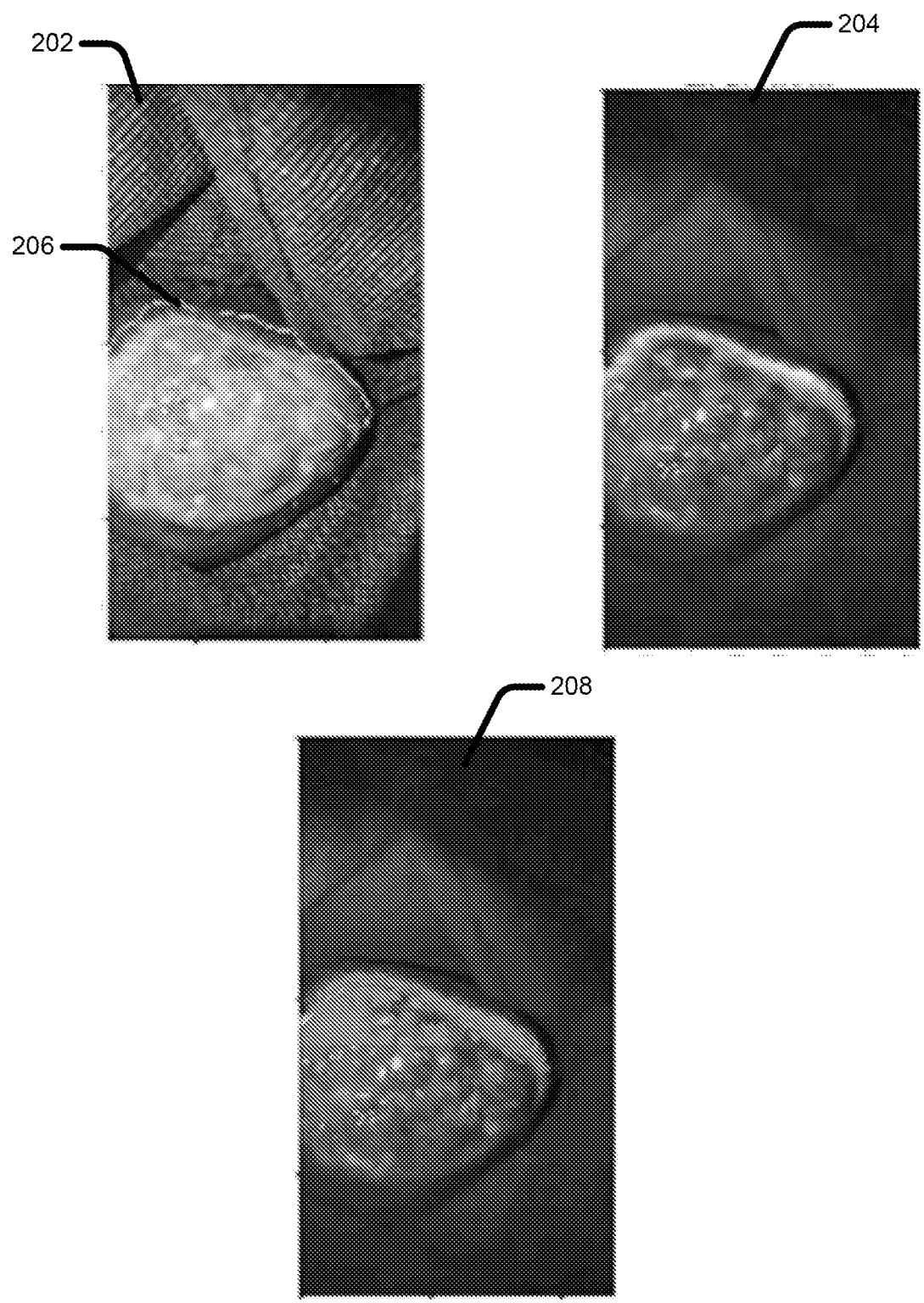
Figure 2D:
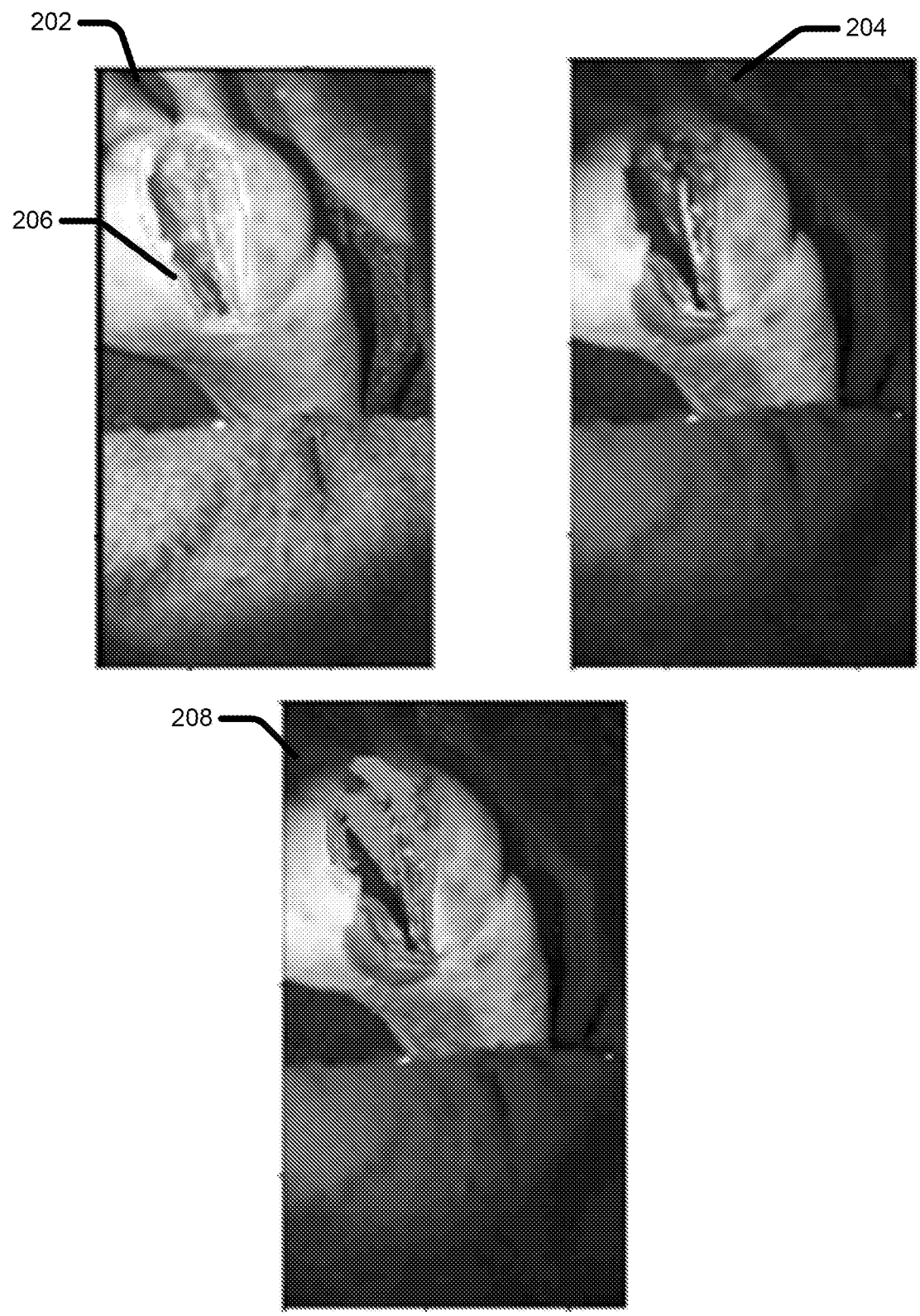
Figure 2E:
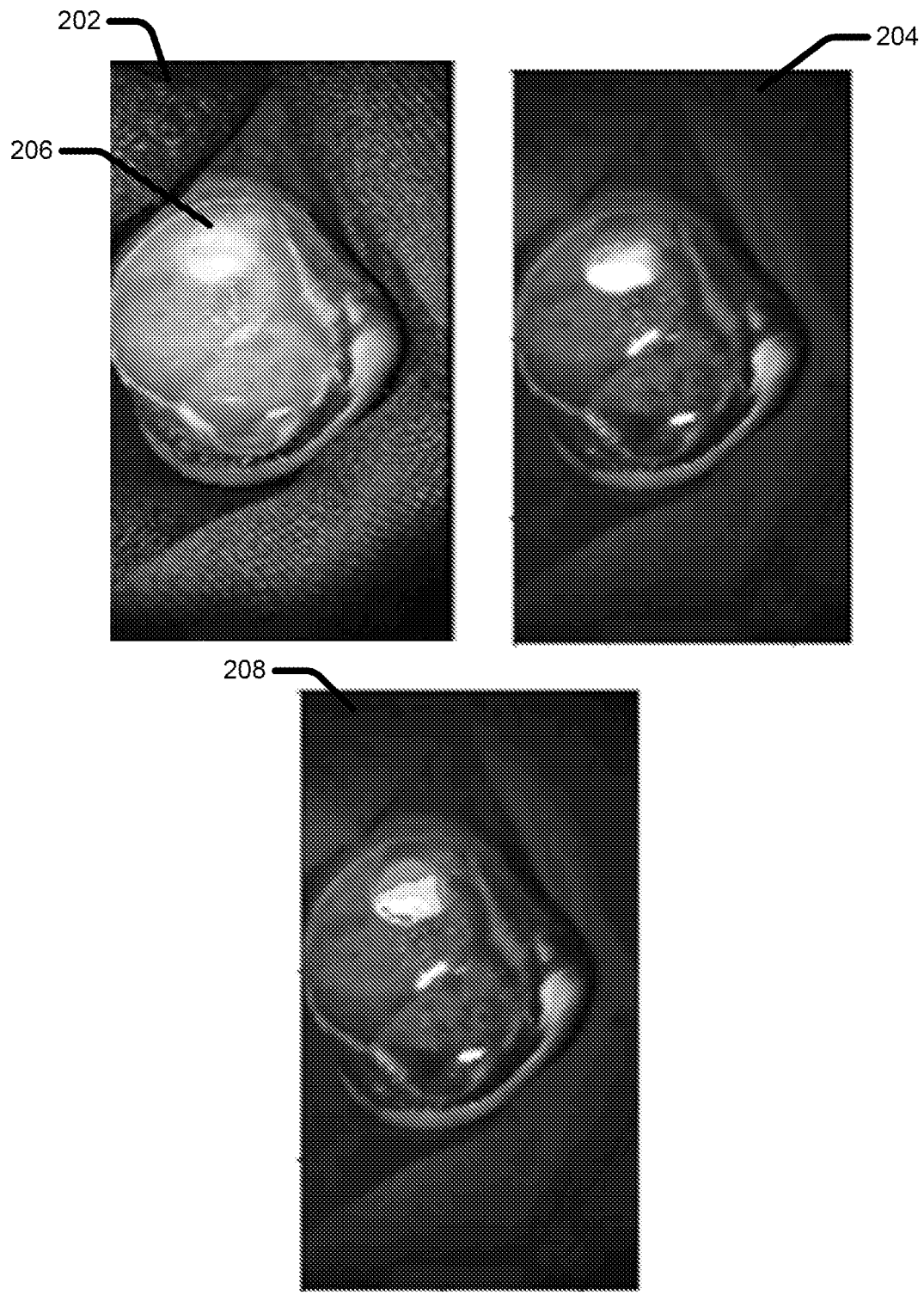
Figure 2F:
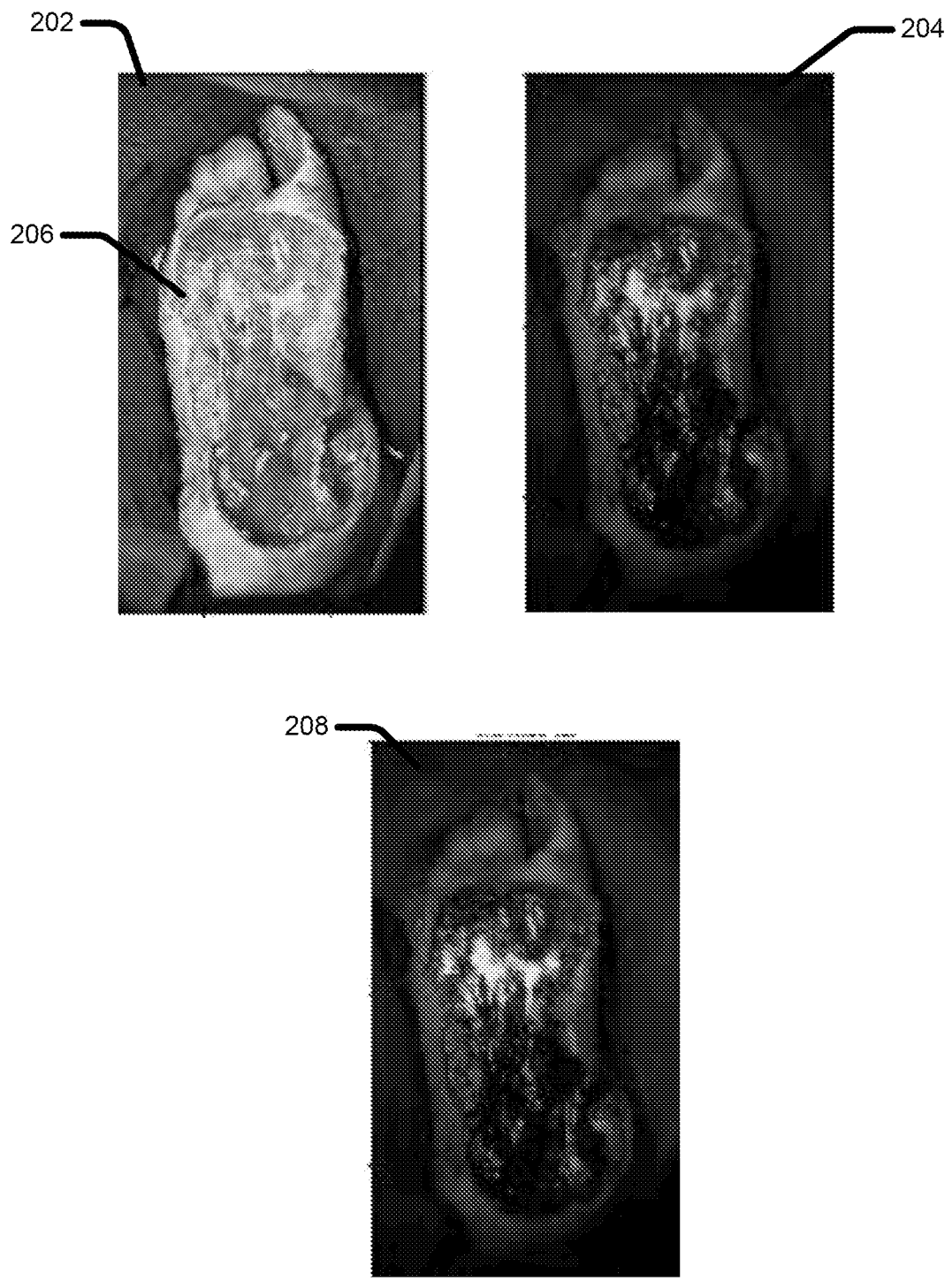
Figure 2G:
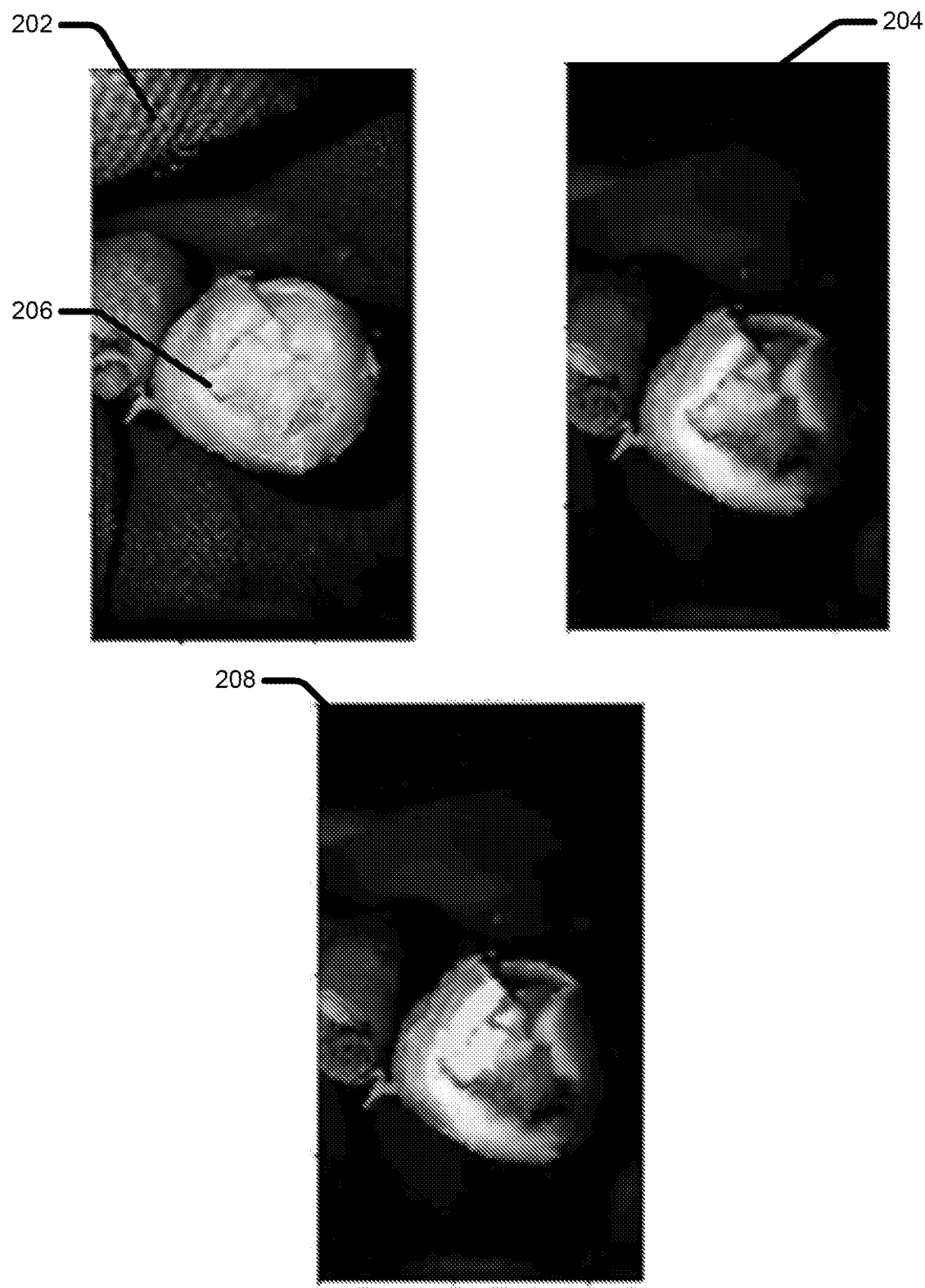
Figure 2H:
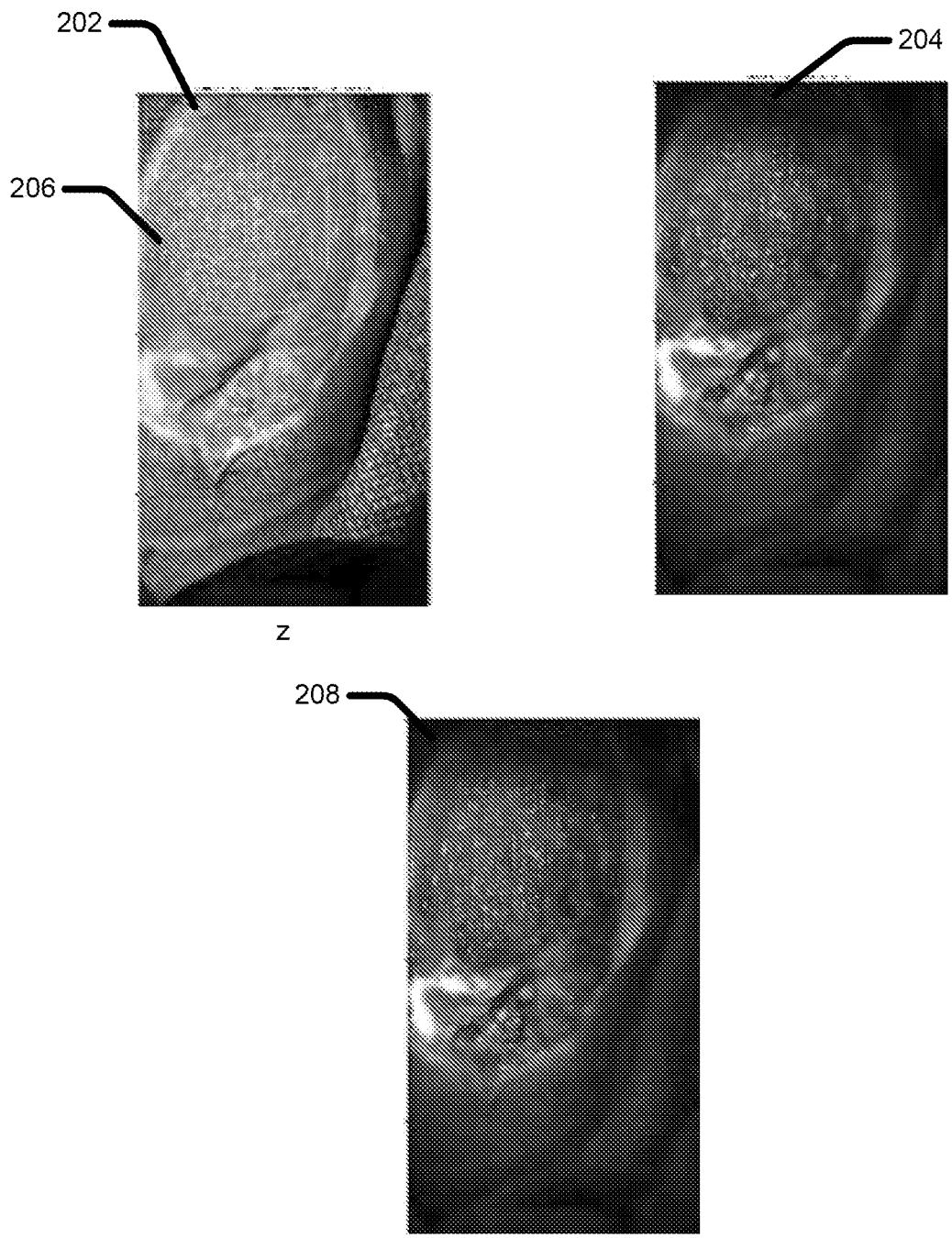
Figure 2I:
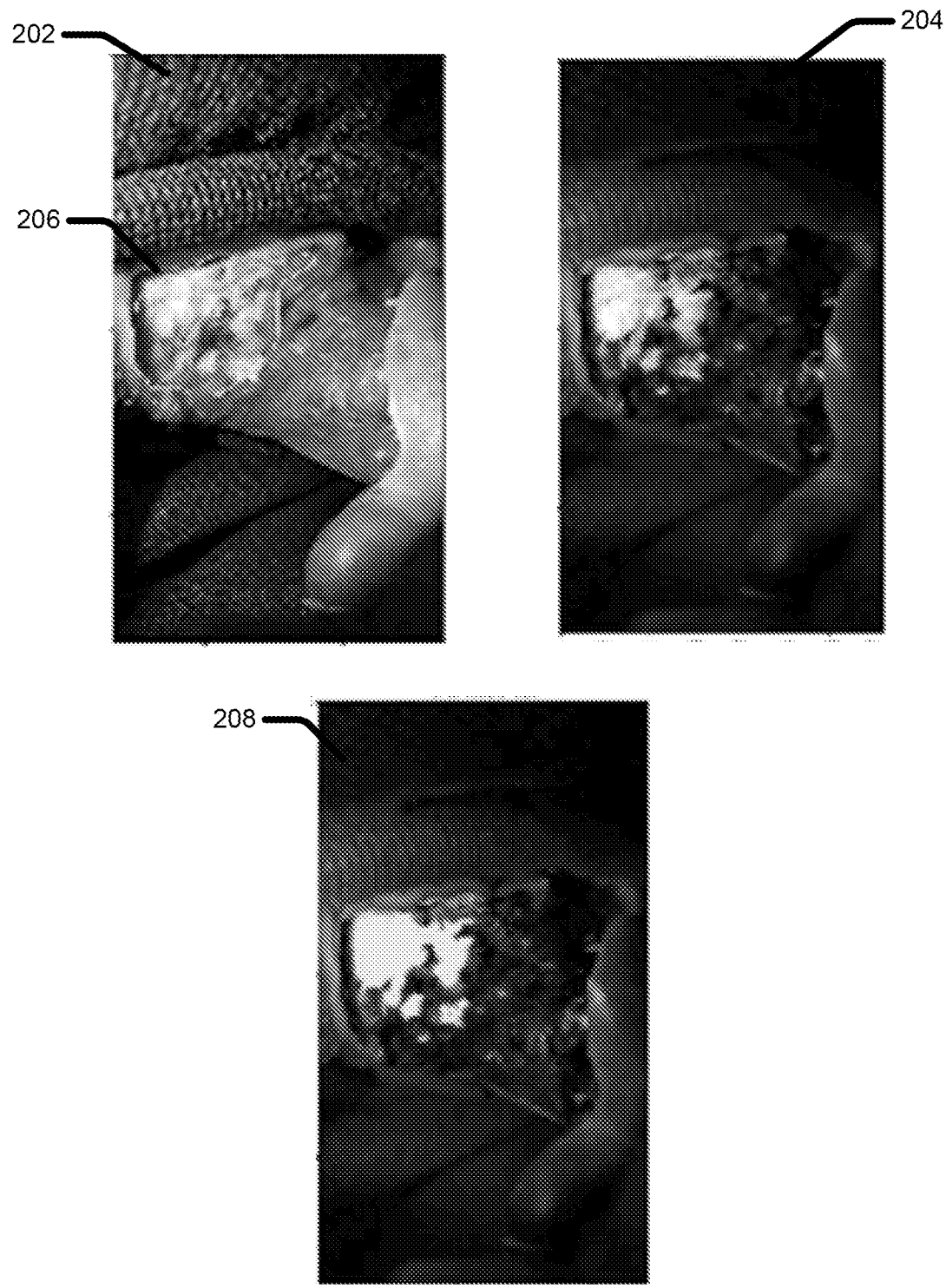

Presence of problematic cellular entities on a target is to be accurately detected. The target may be, for example, a wound region in a human body, an edible product, a tissue sample extracted from a human body, or a surface that is to be sterile. Typically, detection of problematic cellular entities, such as a pathogen, is performed using a culture method. In this method, a sample is taken from a site that is expected to have a pathogen infection using a swab/deep tissue biopsy. Subsequently, the sample is subjected to an appropriate culture medium, in which the pathogen expected to be in the site grows with time. The pathogen, if any, in the site is then isolated and identified using biochemical methods. For problematic cellular entities, such as a cancerous tissue, tissue biopsy is taken. Further, the tissue biopsy is examined under microscopy with staining methods, such as hematoxyline and Eosin staining, Mucicarmine staining, Papanicolaou stain, and the like, to identify if the tissue is a cancerous tissue. In some examples, the examination may be performed without staining methods. As will be appreciated, the aforementioned methods are cumbersome, require specialized microbiology facilities, and takes 1-2 days to accurately identify the infection and classify the pathogen or the cancerous tissue.

In some cases, detection and classification of problematic cellular entities is performed based on autofluorescence arising from native biomarkers in the problematic cellular entities. The native biomarkers may be, for example, Nicotinamide adenine dinucleotide (NADH), Flavins, Porphyrins, Pyoverdine, tyrosine, and tryptophan. The autofluorescence arising from the biomarkers may be unique to them, and may be useful for detection and classification of the problematic cellular entities.

Although autofluorescence can be used for the detection and classification, the autofluorescence arising from the native biomarkers is weak, and may not be easily detected. Further, in addition to the autofluorescence, the light emerging from a target may include background light and excitation light, which may interfere with the emitted autofluorescence. Accordingly, to enable detection and classification using the emitted autofluorescence, optical filters, which suppress non-fluorescent light emitted by the target, are to be used. The optical filters may also be referred to as emission filters. The usage of the emission filters makes the detection based on autofluorescence expensive.

Further, multiple emission filters are to be used in a device employing the autofluorescence-based detection, as autofluorescent light of different wavelengths are to be captured for the detection and classification. The capturing of images using different emission filters increases the time for the detection and classification. Further, additional components, such as a filter wheel, is to be used for capturing images using the different emission filters, which further increases the cost of the device.

The present subject matter relates to fluorescence-based detection of problematic cellular entities. Using the present subject matter, a device for detection of problematic cellular entities can be made simple and cost-effective. The device may be free of a filter wheel. Further, a quick and accurate detection of problematic cellular entities can be achieved using machine and deep learning techniques.

A device according to the present subject matter may include a light source for emitting light for illuminating a target. The target may be suspected of having a problematic cellular entity, such as a pathogen or a cancerous tissue. In an example, the target may be made of one or more cells, and may be, for example, a wound in a body part or a tissue sample. In other examples, the target may be an article that is to be free of pathogens, such as an edible product, a laboratory equipment, or a sanitary equipment. The emitted light may be in a wavelength band that causes a marker in the target to fluoresce when illuminated. In particular, the emitted light may be of a single wavelength that causes a marker in the target to fluoresce when illuminated. The marker may be part of the problematic cellular entity. The fluorescence emitted by the marker that is part of the problematic cellular entity may be referred to as autofluorescence. In an example, an exogenous marker, such as a synthetic marker, may be sprayed on the target to cause detection of the problematic cellular entity in the target. The exogenous marker may bind to cellular entities, such as deoxyribonucleic acid (DNA), Ribonucleic acid (RNA), proteins, biochemical markers, and the like, which may cause the target to fluoresce. The fluorescence emitted by the added synthetic marker may also be referred to as exogenous fluorescence.

The device includes an image sensor to directly receive light emitted by the target in response to the illumination thereof by the light source and to capture an image formed based on the light emitted. If the target includes a marker that fluoresces, the captured image includes fluorescence, and may be referred to as a fluorescence-based image. Therefore, the fluorescence-based image may include fluorescence emerging from the target. Here, the light is said to be directly received by the image sensor because the light is not filtered by an emission filter before capturing of the image.

The device further includes a processor to analyze the fluorescence-based image. The analysis may be done using an analysis model that is trained using a plurality of reference fluorescence-based images for detecting the presence of problematic cellular entities in targets. In an example, the analysis model may include an artificial neural network (ANN) model. In another example, the analysis model may include a machine learning (ML) model other than an ANN model, such as a support vector machine (SVM) model, logistic regression model, random forest model, and the like, or a combination thereof. In a further example, the analysis model may include both an ANN model and a ML model.

The analysis by the analysis model may include analyzing the fluorescence in the fluorescence-based image, such as the wavelengths of fluorescence. The analysis model may be trained to differentiate between fluorescence in the fluorescence-based image emerging from the problematic cellular entity and fluorescence in the fluorescence-based image emerging from regions other than the problematic cellular entity. For example, the analysis model may differentiate between fluorescence emerging from a wound region having a pathogen and fluorescence emerging from a bone in the wound region or a skin adjacent to the wound region. Accordingly, the analysis model may analyze fluorescence from the region that is expected to have the problematic cellular entity, and not the background fluorescence. Based on the analysis, it may be detected that the problematic cellular entity is present in the target.

In addition to detecting the presence of the problematic cellular entity in the target, the analysis model may also classify the problematic cellular entity. For example, if the problematic cellular entity is a pathogen, the analysis model may identify the gram type or species of the problematic cellular entity.

The present subject matter utilizes an analysis model that is trained over several reference fluorescence-based images for detecting the presence of problematic cellular entity in the target. In addition, in an example, the analysis model may be trained over several reference white light images that may be used to initially differentiate the regions, such as a wound region, a bone region, and the like. Subsequently, the analysis model may be trained over several reference fluorescence-based images for detecting the presence of the problematic cellular entity in the target, thereby increasing the accuracy of the detection. The analysis model may ignore the background light and excitation light in the fluorescence-based image, and may pick up the weak fluorescence information in the fluorescence-based image. Thus, the present subject matter eliminates the use of an emission filter for filtering the background light and excitation light. As such, use of a filter wheel as part of the device of the present disclosure may be avoided. Thus, the device of the present subject matter is simple and cost-effective.

Thus, the present subject matter provides a rapid, filter-less, non-invasive, automatic, and in-situ detection and classification of pathogens using an "opto-computational biopsy" technique. The opto-computational biopsy technique is a technique in which multispectral imaging is used along with the computational models, such as machine learning models, Artificial Neural Network (ANN) models, deep learning models, and the like, for non-invasive biopsy to detect and classify the problematic cellular entities.

The present subject matter can be used for detecting the presence of problematic cellular entities in diabetic foot ulcers, surgical site infections, burns, skin, and interior of the body, such as esophagus, stomach, and colon. The device of the present subject matter can be used in the fields of dermatology, cosmetology, plastic surgery, infection management, photodynamic therapy monitoring, and anti-microbial susceptibility testing.

The above and other features, aspects, and advantages of the subject matter will be better explained with regard to the following description, appended claims, and accompanying figures. It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present disclosure. Moreover, all statements herein reciting principles, aspects, and examples thereof, are intended to encompass equivalents thereof. Further, for the sake of simplicity, and without limitation, the same numbers are used throughout the drawings to reference like features and components.

In the below explanation, the present subject matter has been mainly explained with reference to detection and classification of pathogens on wounds. However, it is to be understood that the device of the present subject matter can be used to detect pathogens in other samples, such as pus, blood, urine, saliva, sweat, semen, mucus, plasma. Further, the device may be used to detect the time-dependent changes in the fluorescence to understand colonization of pathogens and necrotic tissue.

The device may also be used to detect pathogen presence in hands and on surfaces, for example, in hospitals and other places that are to be free of pathogens. The device may be used to detect pathogen contamination in edible products, such as food, fruits, and vegetables.

FIG. 1 illustrates a device 100 for examining a target 102, in accordance with an implementation of the present subject matter. The target 102 may be one that is suspected to be having a problematic cellular entity, such as a pathogen, a cancerous tissue, or a necrotic tissue. The target 102 may be made of one or more cells. For example, the target 102 may be a wound on a human body part, such as foot or hand. The wound may be suspected of having a pathogen in it, which may cause delay in healing of the wound or may cause an infection of the wound. In another example, the target 102 may be a tissue sample that is suspected to have tumor or necrosis in it. In another example, the target 102 may be an edible product, which may have to be tested for the presence of pathogens before supplying it for human consumption. In other examples, the target 102 may be a laboratory equipment, a mask, a head mask, a surgical blade, a sanitary device, a sanitary equipment, ambient air, a biochemical assay chip, and a microfluidic chip. In the below examples, the problematic cellular entity is explained with reference to pathogens and the target 102 is explained with reference to a wound on a human body part.

The device 100 includes a first light source 104 to illuminate the target 102 with light, as indicated by arrow 106. The light may be in a suitable wavelength band, in particular, of a suitable wavelength, that may cause one or more markers in the target 102 to fluoresce when illuminated. In an implementation, an excitation filter (not shown in FIG. 1) may be provided in the device 100, which may filter a particular frequency or a particular frequency band from the light emitted by the first light source 104. It is to be noted that the excitation filter is different from an emission filter, which is used in conventional devices for filtering out a frequency band emitted by a target in response to illumination of the target. In an example, the light may be, ultraviolet (UV) light, visible light, or Near Infra-red (NIR) light. In an example, the wavelengths of the light that are used to elicit fluorescence from the target 102 may include 280 nm, 310 nm, 330 nm, 365 nm, 395 nm, 405 nm, 415 nm, 430 nm, 480 nm, and 520 nm. In addition, in an example, some other wavelengths apart from these wavelengths may also be used. For instance, in scenarios, where the device 100 may be used to understand tissue oxygenation, as will be described with respect to FIG. 6(d), the wavelengths may include 430 nm, 680 nm, 740 nm, and 940 nm. The markers may be part of a problematic cellular entity that is present in the target 102.

The light emitted by the target 102 in response to its illumination is collected by an image sensor 108, as indicated by arrow 110. The image sensor 108 may be part of a camera (not shown in FIG. 1) of the device 100 and may be a digital image sensor, such as a charge coupled device (CCD) sensor (or) digital camera, a complementary metal-oxide semiconductor (CMOS) sensor (or) digital camera, a single-photon avalanche diode (SPAD)/Avalanche Photodetector (APD) array, a photomultiplier tube (PMT) array, Near-infrared (NIR) sensor, Red Green Blue (RGB) sensor, 3-dimensional (3D) camera, or a combination thereof. The image sensor 108 captures an image formed from the light received from the target 102. If the target includes a marker that fluoresces, the image captured includes fluorescence. Accordingly, the image may be referred to as a fluorescence-based image.

The device 100 may include a processor 112. The processor 112 may be implemented as a microprocessor, a microcomputer, a microcontroller, a digital signal processor, a central processing unit, a state machine, a logic circuitry, and/or any device that can manipulate signals based on operational instructions. Among other capabilities, the processor 112 may fetch and execute computer-readable instructions included in a memory (not shown in FIG. 1) of the device 100. The processor 112 may activate the image sensor 108 when it is to capture the light emitted by the target 102. To this end, the processor 112 may activate the image sensor 108 when it activates the first light source 104 for emitting light.

Further, in an example, the fluorescence-based image may be analyzed by a processor 112 of the device 100. To analyze the fluorescence-based image, the processor 112 may utilize an analysis model 114. The analysis model 114 may be trained over a plurality of fluorescence-based images of targets for detecting the presence of problematic cellular entities in the targets. The fluorescence-based images using which the analysis model 114 is trained may be referred to as reference fluorescence-based images. The analysis model 114 may also include a plurality of white light images. The analysis model 114 may include, for example, an artificial neural network (ANN) model, which may be a simplified model of the way a human nervous system operates, and which may include several interconnected nodes arranged in a plurality of layers. The ANN may be, for example, a deep learning model, such as a convolutional neural network (CNN), a generative adversarial network (GAN), an autoencoder decoder network. In another example, the analysis model 114 may include a machine learning (ML) model other than an ANN model. Hereinafter, an ML model other than an ANN model may be referred to as an ML model. The ML model may be, for example, a support vector machine (SVM) model or a random forest model or a combination thereof. In a further example, the analysis model 114 may include both an ANN model and an ML model. In other examples, the analysis model 114 may include one or more ANN models and/or one or more ML models.

The analysis model 114 may analyze the fluorescence-based image. For example, the analysis model 114 may analyze the wavelengths of the fluorescent light in the fluorescence-based image. Since the fluorescence in the fluorescence-based image is caused because of a marker in the target 102, the fluorescence may indicate the markers present in the target 102. Further, since a marker in the target 102 may be part of a pathogen, the analysis of the fluorescence-based image may be used to detect the presence of the pathogen in the target 102. The analysis may also be used to determine the type of the pathogen, such as a gram type of the pathogen, a species of the pathogen, family of the pathogen, genus of the pathogen, or a strain level of the pathogen.

The device 100 may also include a second light source 116. The second light source 116 may emit light (as indicated by arrow 118) of such a wavelength that may not cause the markers in the target 102 to fluoresce. For example, the second light source 116 may be a white light source, which may emit white light. The light emitted by the second light source 116 may be reflected by the target 102, as indicated by arrow 120. The reflected light may be captured by the image sensor 108 to form a second image of the target 102. If the second light source 116 is a white light source, the second image may be referred to as a white light image.

In an example, the device 100 may include a plurality of polarizers (not shown in FIG. 1). A polarizer may be an optical element that lets light waves of a specific polarization pass through while blocking light waves of other polarizations. A polarizer may condition a beam of light of undefined or mixed polarization into a beam of well-defined polarization. In an example, a polarizer may be integrated with the first light source 104, another polarizer may be integrated with a second light source 116, and yet another polarizer may be integrated with the image sensor 108. The use of the polarizers may help in reducing specular reflection of the target 102, such as the wound, while capturing the white light image. Further, while capturing the fluorescence-based image, the polarizers may enable selective detection of the fluorescence and reduce the interference of the emitted light from the light source 104 with the fluorescence emitted by the target 102. For instance, two polarizers, such as a polarizer integrated with the light source 104 and another light polarizer integrated with the image sensor 108, may be arranged in a cross-polarizer geometry to minimize the interference of the emitted light from the light source 104 with the fluorescence emitted by the target 102.

In some implementations, the device 100 may include additional light sources (not shown in FIG. 1), which may emit light of different wavelengths. The processor 112 may control the sequence of operation of the various light sources and also the period of illumination of each light source. A light source in the device 100 may be a light emitting diode (LED), laser, or the like. Further, a light source in the device 100 may emit light that has a wavelength between 200 nm to 2500 nm. The device 100 may include light sources emitting light of different wavelength because the wavelength that may cause a marker in a target to fluoresce may vary from one marker to another. Thus, providing light sources emitting light of different wavelengths ensures that a wide range of markers may be made to fluoresce, thereby allowing detection of several types of pathogens.

Further, the device 100 may include an additional image sensor (not shown in FIG. 1), which may be a digital image sensor, in addition to the image sensor 108. For example, the image sensor 108 may be used for capturing fluorescence-based images and another image sensor may be used for capturing white light images. A further image sensor (not shown in FIG. 1) may be used for capturing three-dimensional (3D) images of the target.

The analysis model 114 may be trained to identify the target 102 in the second image. For example, if the second image is an image of a human foot having a wound, the analysis model 114 may identify the wound region in the second image. The identification of a wound region in an image is also referred to as wound segmentation.

In an example, the analysis model 114 may correct for the background fluorescence by first recognizing the type of the target, such as bone, tissue, tendon, and the like, in the second image and evaluate the presence of cellular anomaly even on targets with significant background fluorescence.

In an implementation, the analysis model 114 may identify the target 102 in the fluorescence-based image by comparing the second image with the fluorescence-based image. Upon identifying the target 102 in the fluorescence-based image, the analysis model 114 may analyze the fluorescence emerging from the target 102 for detecting the presence of pathogens, and may ignore the fluorescence emerging from regions other than the target in the fluorescence-based image. For example, the analysis model 114 may analyze the fluorescence emerging from the wound, and may ignore fluorescence emerging from the adjoining regions, such as bones, tendons, and skin, in the fluorescence-based image. Further, in an implementation, the analysis model 114 may analyze the fluorescence from the regions other than the target 102 in the fluorescence-based image, and may detect the presence of an anomaly in the other regions based on the analysis. For example, the analysis model 114 may analyze the fluorescence emerging from bones in the fluorescence-based image, and may determine if there is anomaly in the bones based on the analysis. For instance, if the fluorescence is higher than that typically emitted by the bones, it may be determined that there is an anomaly in the bones.

The device 100 may include a display 122 to display a result of the analysis of the detection of presence of the problematic cellular entity in the target and type of the problematic cellular entity. The display 122 may be a touch sensitive display that receives input from a user via a finger or fingers or stylus. For example, the device 100 may display that a pathogen is present in the target 102 and may display the type of the pathogen on the display 122. In an implementation, the result of the analysis may be overlaid on an image of the target 102 as captured by the image sensor 108. For example, the regions of the target 102 having the pathogens may be highlighted on the fluorescence-based image.

In an implementation, the device 100 may be implemented as a portable and handheld device. The device 100 may include a computing device, which may include the processor 112. The computing device may be, for example, a smartphone or a system on chip (SoC) or a system on module (SoM). If the computing device is a smartphone, the image sensor 108 may be part of the computing device. The device 100 provides a non-invasive, automatic, and in-situ detection and classification of pathogens and tissues. As used herein, it will be understood that in-situ refers to the detection of pathogens in the sample of a source without any pre-processing of the sample. For example, the sample may be a wound on a body site. In an example, the device 100 may be powered by a power source (not shown in FIG. 1).

FIGS. 2(*a*)-2(*i*) illustrate reference image sets that may be used for training an ANN model of an analysis model 114, in accordance with an implementation of the present subject matter. Here, the target 102 is explained with reference to a wound on a human foot. As explained above, the ANN model may be used for detecting the presence of pathogens in a fluorescence-based image based on fluorescence emitted by the target 102 in the fluorescence-based image. To facilitate the detection, the ANN model may be trained using a plurality of reference white light images and a plurality of corresponding reference fluorescence-based images. A fluorescence-based image corresponding to a white light image refers to a fluorescence-based image of the same region as captured by the white light image. Accordingly, each image set includes a reference white light image and a corresponding reference fluorescence-based image. For example, images 202 and 204 are a reference white light image and a corresponding reference fluorescence-based image respectively.

A reference white light image may be tagged with an indication of the wound in that image and/or an indication of another region, such as a bone or skin, in that image. For example, a region 206 of the white light image 202 is tagged to indicate that it represents a wound region. Accordingly, by training over the plurality of reference white light images, the ANN model becomes capable of identifying a wound, a bone, skin, and the like on a given image.

Further, by training over the plurality of reference fluorescence-based image corresponding to the white light images, the ANN model may also be capable of identifying the various regions, such as bone, skin, granulation, and the like, on a fluorescence-based image, and accordingly determine the type of pathogen or gram positive, or gram negative in the wound region. For instance, by training over the plurality of fluorescence-based images and using reference labels corresponding to the type of pathogen, or gram positive or gram negative pathogens, any new target image can be classified. Target image may be the image used in the training to understand and evaluate the accuracy of the training or an entirely new target image(s). Then, a third image, such as the image 208, i.e., the output of the ANN model, is generated. In the image 208, portions of the wound that are detected to have pathogen are highlighted. In some examples, different types of pathogens in the wound are highlighted in different shades. For example, in images 208 depicted in FIGS. 2(*d*) and 2(*e*), the two different pathogens in the wound are highlighted with different shades. In an example, different types of pathogens in the wound may be highlighted using different colors.

In an implementation, a region of the third image 208 having a particular pathogen may be tagged with an indication of that pathogen. For example, a region of the image 208 having a first pathogen is tagged with an indication of the first pathogen, and a region of the image 208 having a second pathogen is tagged with an indication of the second pathogen. Thus, by training over a plurality of image sets, the ANN model becomes capable of identifying the pathogens present in a given fluorescence-based image.

As mentioned above, the analysis model 114 may include an ML model for detection and classification of pathogens in a wound. For training of the ML model, a spectral map and a spatial map of each reference fluorescence-based image may be created and fed as features to the ML model. Each spatial map may provide information of texture, porosity, gloss, and the like of the wound and the adjoining regions of the wound. Further, a spectral map may provide information of spectral intensity of each pixel or in a region in the reference fluorescence-based images.

Figure 3:
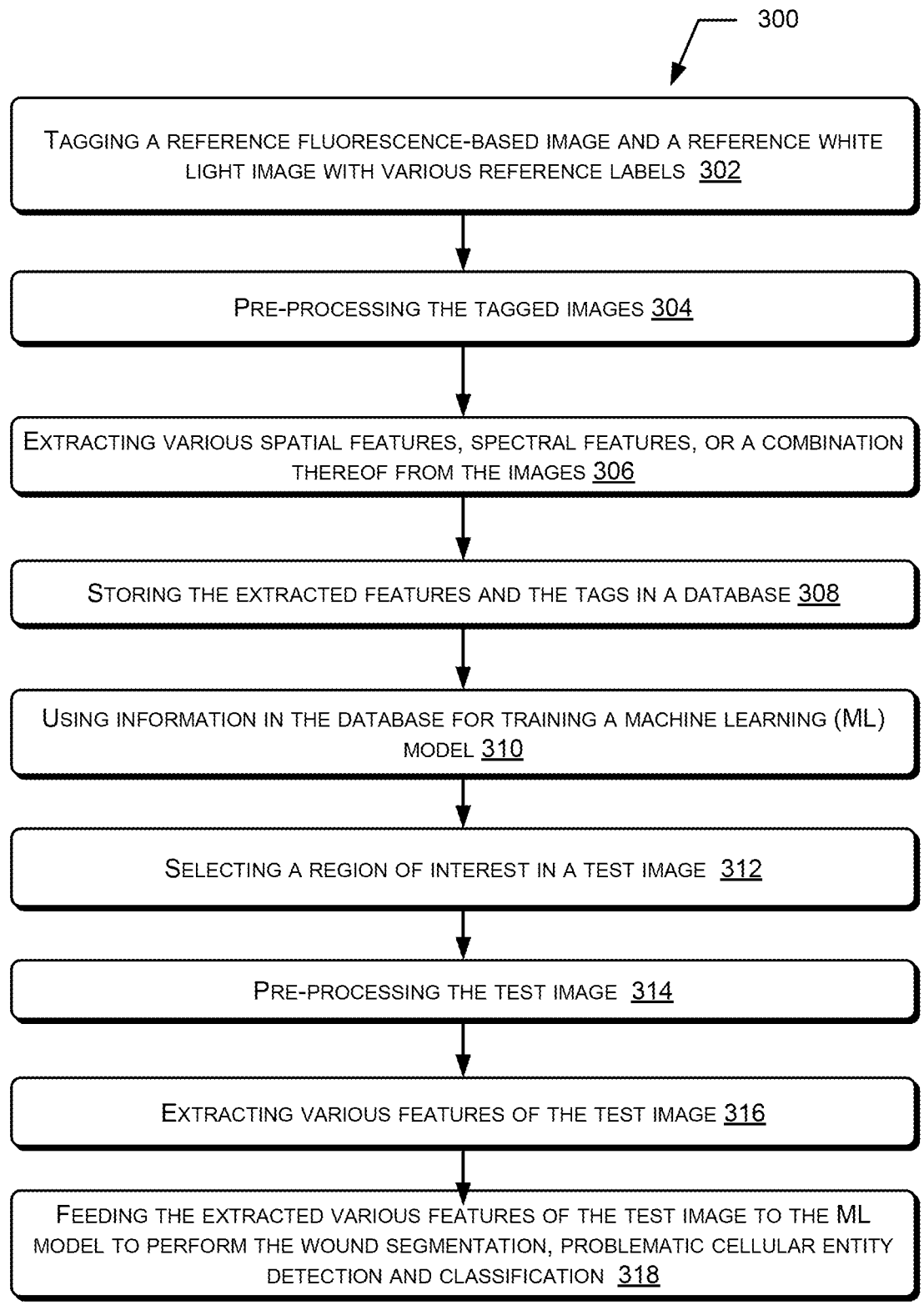
FIG. 3 illustrates training of a machine learning (ML) model based on spatial maps and spectral maps of reference fluorescence-based images, in accordance with an implementation of the present subject matter.

FIG. 3 illustrates training of an ML model based on spatial maps and spectral maps of reference fluorescence-based images, in accordance with an implementation of the present subject matter. At block 302, a reference fluorescence-based image and a reference white light image are tagged with various reference labels, such as a type of the target (i.e., skin or wound), type of wound region (i.e., slough, bone, and the like), infected pathogen species, gram type, and the like. In an example, various spatial features such as such as texture, porosity of the wound and of the adjoining regions, various spectral features such as hue of the fluorescence, or a combination thereof are extracted. In an example, the tagging may be performed in the white light image alone.

At block 304, the tagged images are pre-processed. For example, the images are converted into grayscale, resized, and augmented. Augmenting the images may include rotating the images, flipping the images, and the like. At block 306, various features, such as spatial features, spectral features, or a combination thereof are extracted from the images. In some examples, the spatial features, such as histogram of oriented gradient (HOG) features, Entropy features, Local Binary Patterns (LBP), Scale Invariant Feature Transforms (SIFT), and the like may be extracted from the images. Similarly, in some examples, spectral features may be extracted from the white light images at RGB wavelengths and fluorescence images at various excitation wavelengths. For white light image and the fluorescence image, the spectral features are extracted using Red green blue (RGB), Hue saturation value (HSV) values or any other color map values at each pixel/region. At block 308, the extracted spatial and spectral features and the tags may be stored in a database. The extracted features are then passed onto the ML model for detection and spatial mapping of pathogens, as will be described below. For instance, for some pathogens, such as *Pseudomonas Aeruginosa*, with the use of spatial features and the excitation wavelength, the pathogens can be detected. For some pathogens, such as *Escherichia coli* (*E-coli*), *Klebsiella, Staphylococcus*, and the like, the detection may be done by extracting a combination of both spatial features and spectral features.

The steps 302-308 may be repeated for several reference fluorescence-based images and several white light images till the targeted pre-determined target training accuracy is achieved. At block 310, the information in the database may be used for training the ML model, which may be an SVM model. By virtue of the training, the SVM becomes capable of identifying a wound in a given image based on the extracted spatial features, spectral features, or a combination thereof, of the image. That is, the SVM is capable of performing wound segmentation. In an example, subsequent to the block 310, the method 300 may include a post-processing step, such as connected component labelling, hidden Markov models, and the like, which may be used to smoothen the result of the wound segmentation and thereby, improve the accuracy of wound segmentation.

Upon training of the SVM model, the SVM model may be tested to verify whether it is able to correctly identify wounds in images. Accordingly, at block 312, a region of interest in a test image is selected, at block 314, the test image is preprocessed, and at block 316, spatial features of test images are extracted. At block 318, the extracted features are fed to the SVM model to perform the wound segmentation and problematic cellular entity detection and classification. Subsequently, the result of the wound segmentation, problematic cellular entity detection and classification as performed by the SVM model, may be received.

In an implementation, the ML model used for the wound segmentation may be different than that used for the pathogen detection and classification. Accordingly, the output of the wound segmentation may be provided by the first ML model to the second ML model. The second ML model may then analyze the fluorescence from the wound region as identified by the first ML model, and then detect and classify the pathogens in the wound region. Alternatively, in an example, the second ML model may also use the spatial features, information from the first ML model on wound, bone, tissue region, and the like, in combination with the spectral features for detection and classification of pathogens.

In an implementation, the analysis model 114 may include both an ANN model and an ML model, each performing a different function. For example, the ML model may be trained to perform wound segmentation, while the ANN model may be trained to detect and classify pathogens. In another example, the ANN model may generate the spectral images from the fluorescence-based image, and the ML model, as depicted in FIG. 3 may detect and classify pathogens based on the generated spectral images. In an example, in addition to the fluorescence-based image, the ANN model may also generate the spectral image additionally from the white light image, and the ML model.

In an implementation, the ML model may classify the pathogens in a wound into gram positive (GP) and gram negative (GN) pathogens. Further, the ANN model may identify the species of the pathogens in the wound.

Figure 4A:
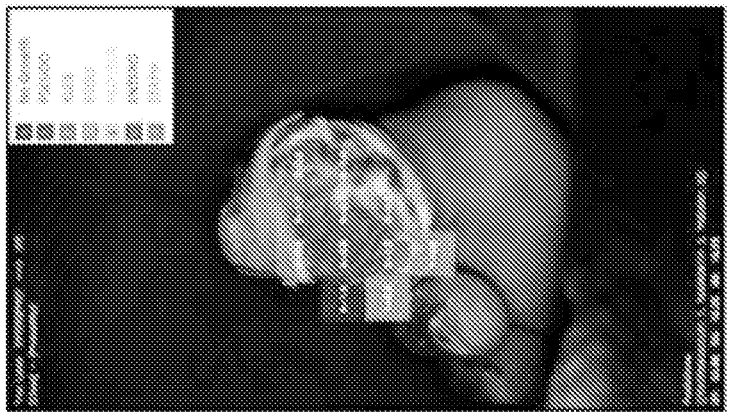
FIGS. 4(a)-(b) illustrate results of classification of pathogens in a wound as detected by an ANN model, in accordance with implementations of the present subject matter.
Figure 4A:
Figure 4A:
Figure 4B:
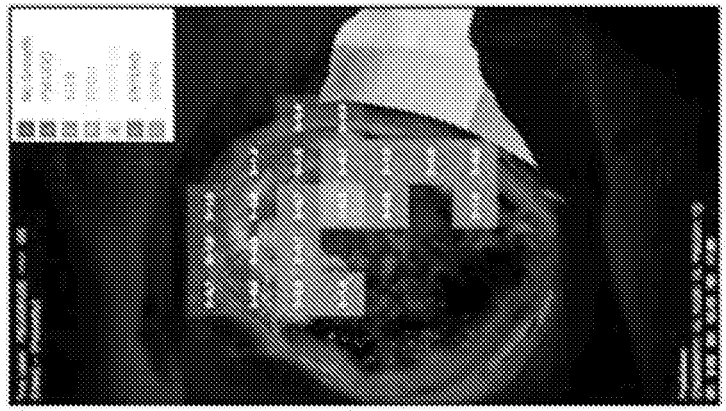
Figure 4B:
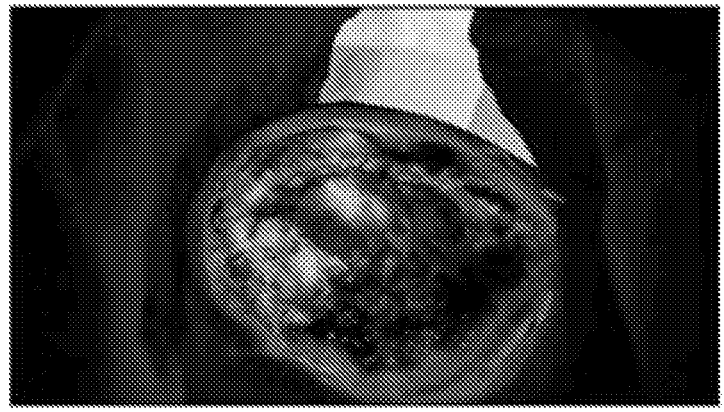
Figure 4B:
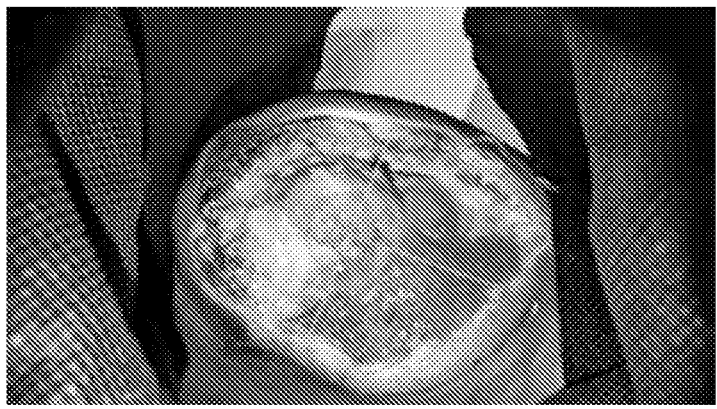
Figure 5A:
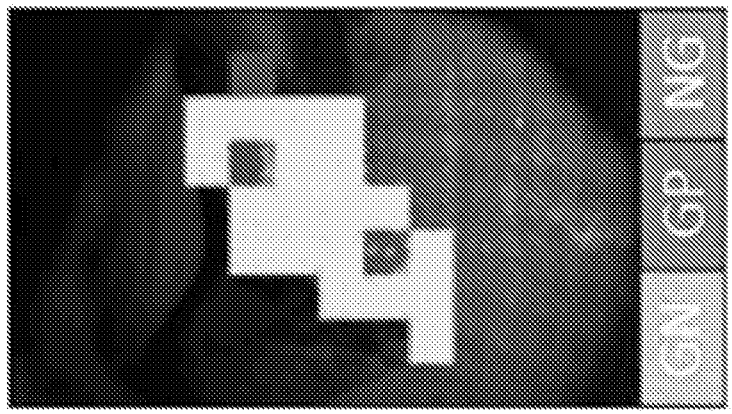
FIGS. 5(a)-(d) illustrate results of classification of gram type of pathogens in a wound as detected by an ANN model, in accordance with implementations of the present subject matter.
Figure 5A:
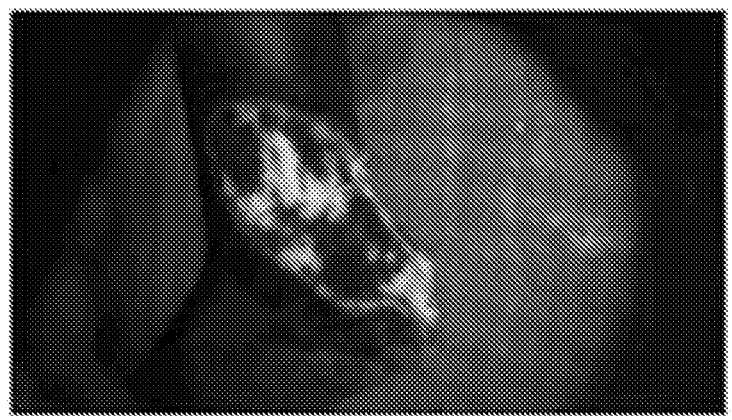
Figure 5A:
Figure 5B:
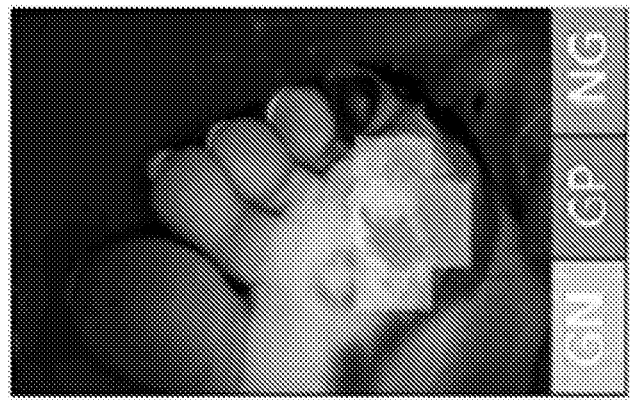
Figure 5B:
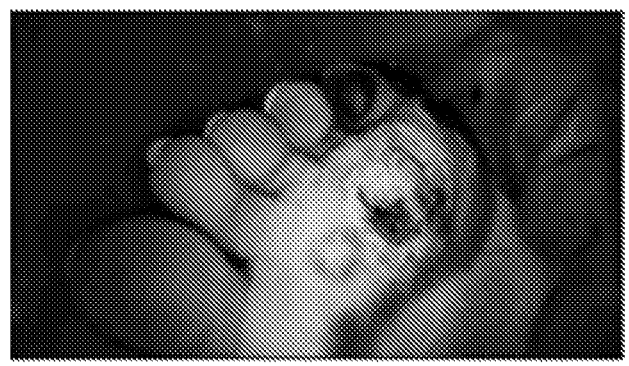
Figure 5B:
Figure 5C:
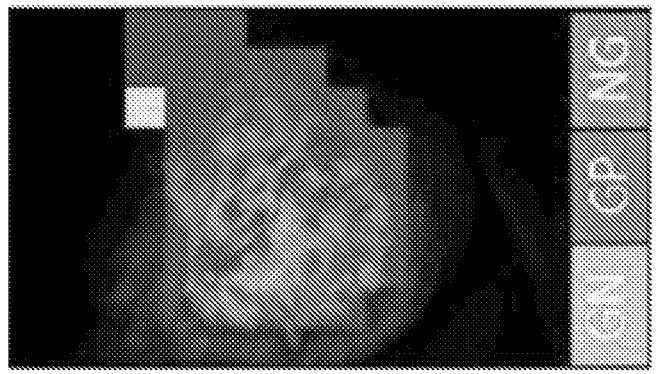
Figure 5C:
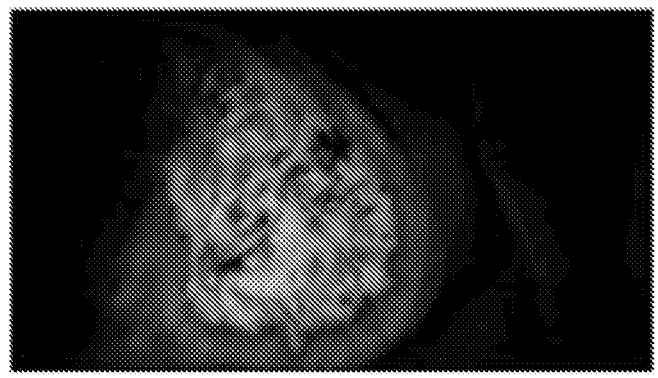
Figure 5C:
Figure 5D:
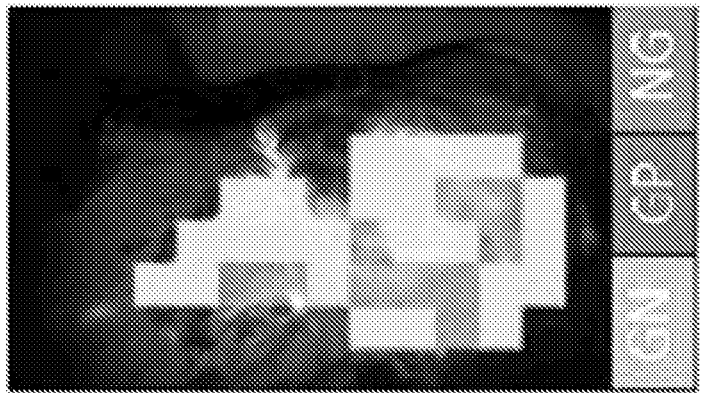
Figure 5D:
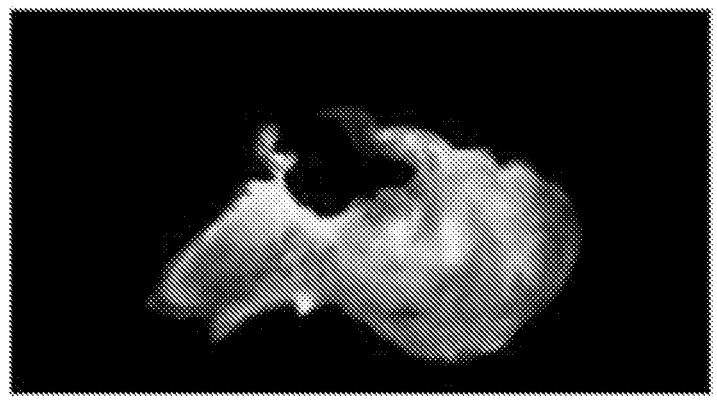
Figure 5D:
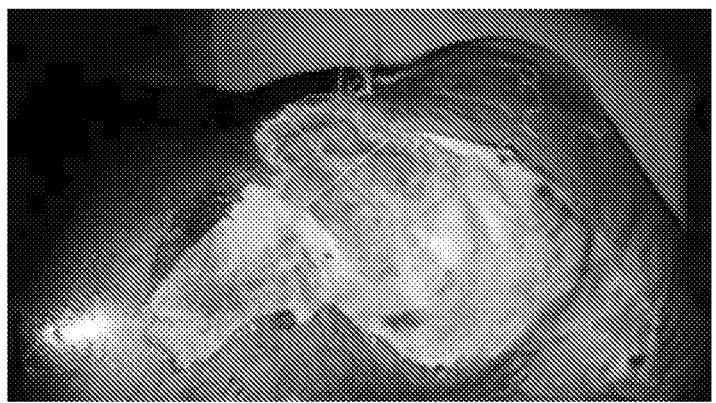

FIGS. 4(a)-(b) illustrate results of classification of the pathogens in a wound as detected by an ANN model, in accordance with implementations of the present subject matter. As illustrated, an indication of the pathogen in a particular region of the wound is overlaid on that region in a fluorescence-based image. In addition, the pathogen probabilities may also be overlaid on the fluorescence-based image.

FIGS. 5(a)-(d) illustrate results of classification of gram type pathogens in a wound as detected by an ANN model, in accordance with implementations of the present subject matter. As illustrated, an indication of gram type of the pathogen in a particular region of the wound is overlaid on that region in a fluorescence-based image. In addition, the pathogen gram type probabilities may also be overlaid on the fluorescence-based image.

In some implementations, the result displayed may also include pathogen spatial distribution in the wound, pathogen growth state data, co-colonization data, biofilm information, biomarker information, pathogen quantification data, spatial mapping of the infection in case of surface or wounds, a treatment protocol to be followed, or a combination thereof, as is depicted in FIGS. 6(a)-6(c). Pathogen growth state data may be obtained from two consecutive report data. For instance, pathogen state growth data may be obtained from the images obtained from the consecutive visits, such as a first visit, a second visit, and the like, of the wound. Pathogen quantification data may be performed based on the intensities captured in the fluorescence-based image of the wound. Co-colonization data may be obtained from probabilities of each pathogen at each region of the wound from the result of the ANN model of the wound. For instance, if probabilities of two pathogens are similar in the result, it is determined that pathogens are co-colonized. That is, if the difference in probability of each pathogen is within a threshold value, i.e., difference in probabilities of the pathogens is less than 10%, then it is determined that those pathogens are co-colonized. The result that is displayed on the screen may also be manipulated by a user, shared, and stored for future use, for example, on a cloud server.

FIGS. 6(a)-6(d) illustrate results of biofilm information, pathogen growth state data, wound dimension and pathogen load, and tissue oxygenation, in accordance with implementations of the present subject matter. As illustrated in FIG. 6(a), Image 602 is a white light image of a wound on an amputated leg with biofilm of the pathogen *Pseudomonas aeruginosa*. Image 604 is a fluorescent-based image when illuminated with a light of 395 nm wavelength. Image 606 is a spatially overlaid colour image that is obtained after implementation of the ML model to detect the biofilm regions 608 having the presence of the pathogen. In addition, the gram type of the pathogen is also identified.

As illustrated in FIG. 6(b), pathogen growth state data is obtained from two (or) more consecutive report data. For instance, image 610, 612, 614 are white light images of the wound on a toe of a patient obtained from consecutive visits, such as a first visit, a second visit, and a third visit, of the wound. Images 616, 618, 620 are images generated by the ML model corresponding to the images 610, 612, 614 respectively to detect the pathogen growth state data. From the images 610-614, changes in infection level of the wound and change in spatial distribution of different type of pathogens during subsequent visits can be clearly understood.

As illustrated in FIG. 6(c), image 622 is a white light image of the wound having a pathogen. Image 624 is a fluorescence-based image of the wound captured when illuminated with a light of 395 nm wavelength. Image 626 is a spatially overlaid color image that is obtained after implementation of the ML model. From the ML model, length, width, area of the wound, gram type of the pathogen may be obtained and displayed, as is depicted in image 628. The wound may be infected with both Gram-positive (Methicillin-resistant *Staphylococcus aureus* (MRSA)) and Gram-negative bacteria (*E-coli*). The images 622-628 obtained correspond to the images obtained on day 1 of the wound.

Further, to track the changes in the wound, images similar to 622, 624, 626, and 628 may be obtained on day 7 of the wound, as is depicted by images 630, 632, 634, 636. By comparing the images 626 with 634 and the image 628 with 636, wound healing and pathogen load change may be tracked.

Further, the device 100 may provide outputs usable to understand wound healing. To determine the wound healing, the device 100 may compare images of the wounds taken over a period of time. For instance, the device 100 may detect and classify the problematic cellular entity present in the wound region based on a white light image and a corresponding fluorescence-based image obtained from a first visit, for example, on day 1. Similarly, the device 100 may detect and classify the problematic cellular entity present in the wound region based on a white light image and a corresponding fluorescence-based image obtained from a second visit, for example, on day 2. Further, the device 100 may compare the image from the first visit and the second visit and may determine whether the wound has healed. Further, the device 100 may also determine the disease prognosis based on the images. For instance, based on the images obtained from the first visit and the images obtained from the second visit, the device 100 may use artificial intelligence models, such as ML models, deep learning models (for example, recurrent neural network (RNN) model, Long short-term memory (LSTM)), to determine the condition of the wound at a future time period, i.e., on day 3, day 4, and the like and may thereby, determine the time taken for the infection/disease to be cured.

Further, the device 100 may provide outputs usable to understand tissue oxygenation. For the tissue oxygenation, the target 102 may be excited using NIR or visible wavelengths and images obtained from the target 102 as a result thereof may be processed to understand the oxygenation at various regions in the target 102. For instance, the processor 112 may use the analysis model 114 and may analyse an image emitted by the target in response to the illumination of the target 102 by the first light source 104. Further, the processor 112 may detect tissue oxygenation at a plurality of regions in tissue based on the analysis. The tissue oxygenation may include total hemoglobin content, oxy-hemoglobin content, de-oxy hemoglobin content, oxygen saturation, blood perfusion, and the like, or combinations thereof.

Figure 6:
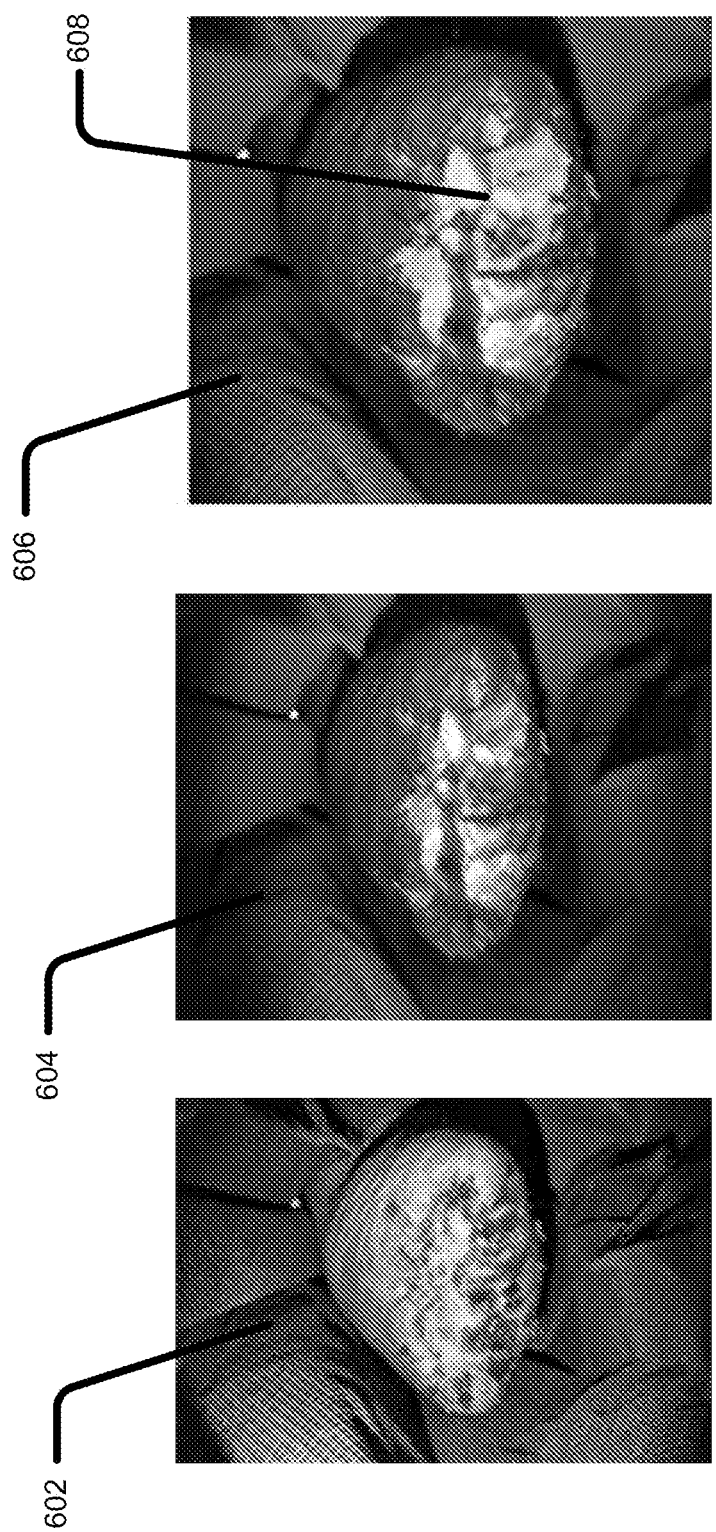
FIGS. 6(a)-6(d) illustrate results of biofilm information, pathogen growth state data, wound dimension and pathogen load, and tissue oxygenation respectively, in accordance with implementations of the present subject matter
Figure 6:
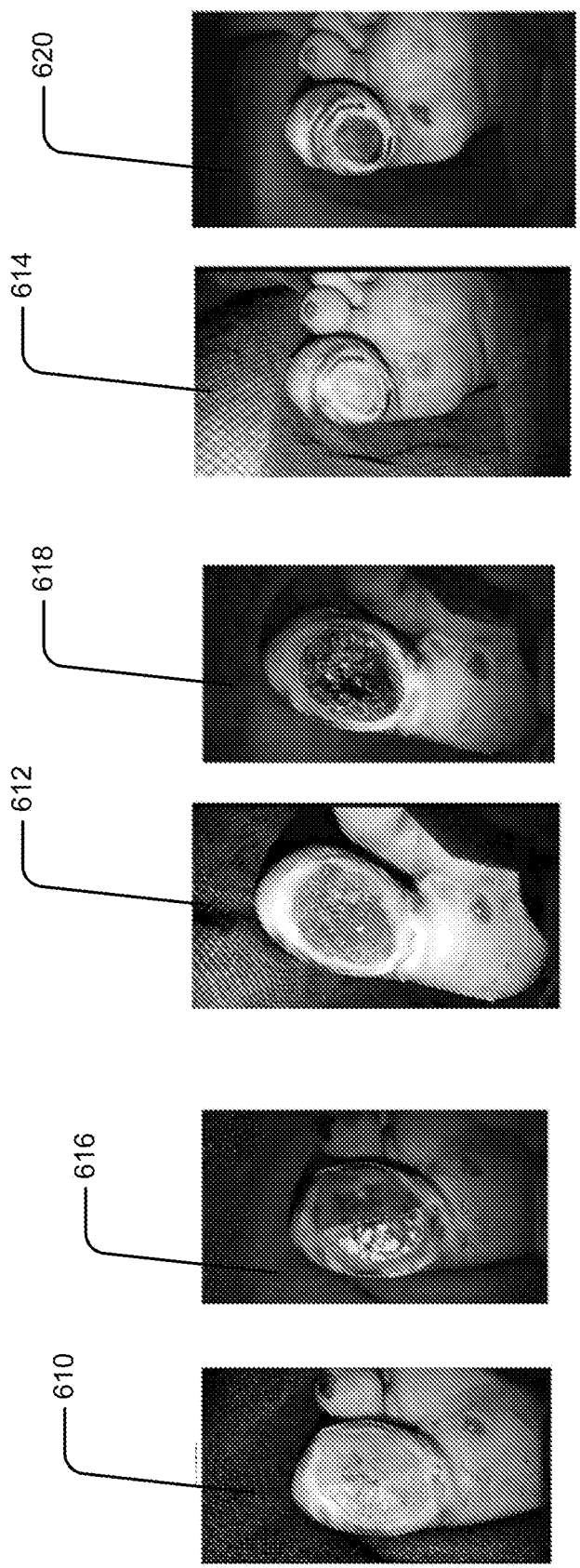
Figure 6:
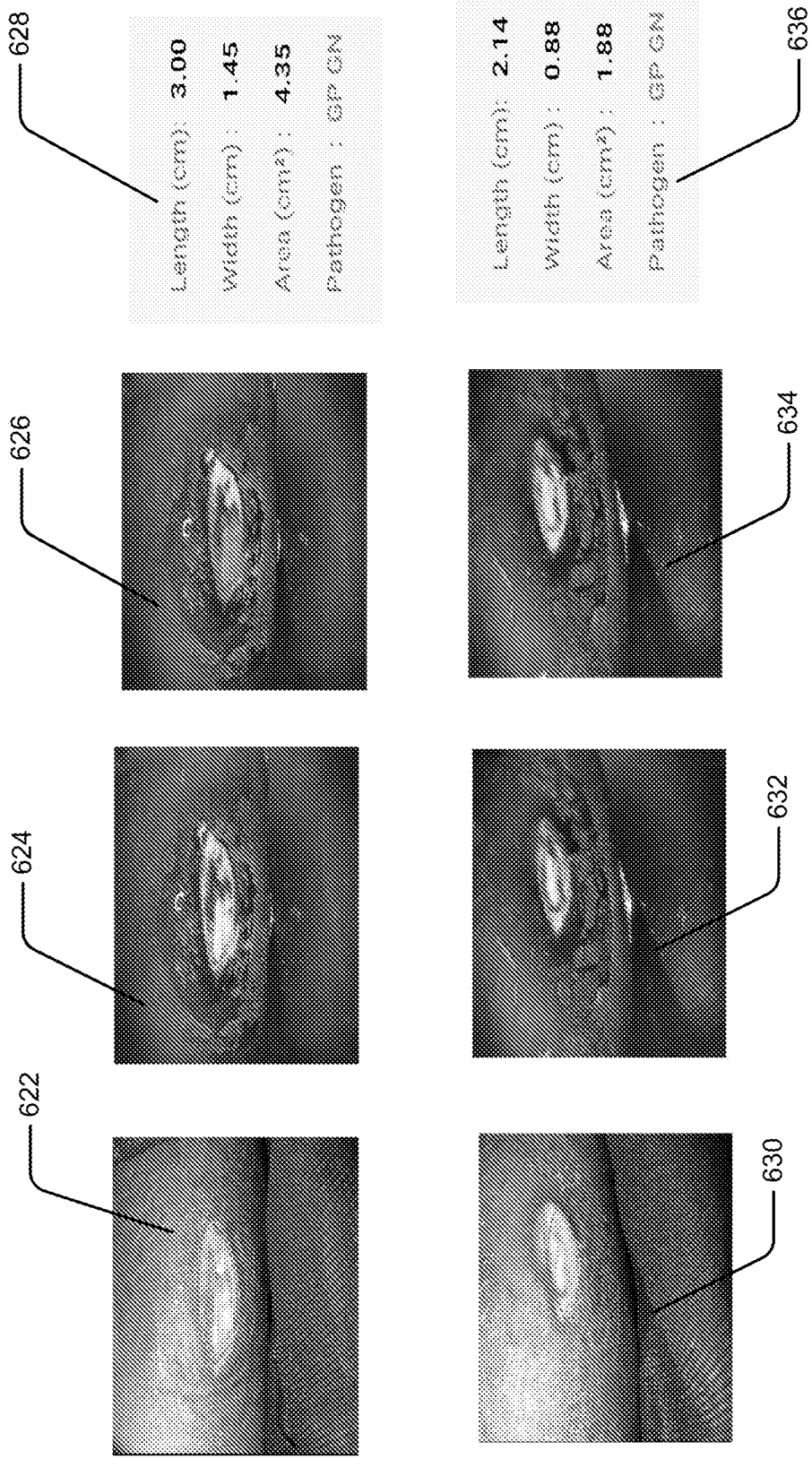
Figure 6:
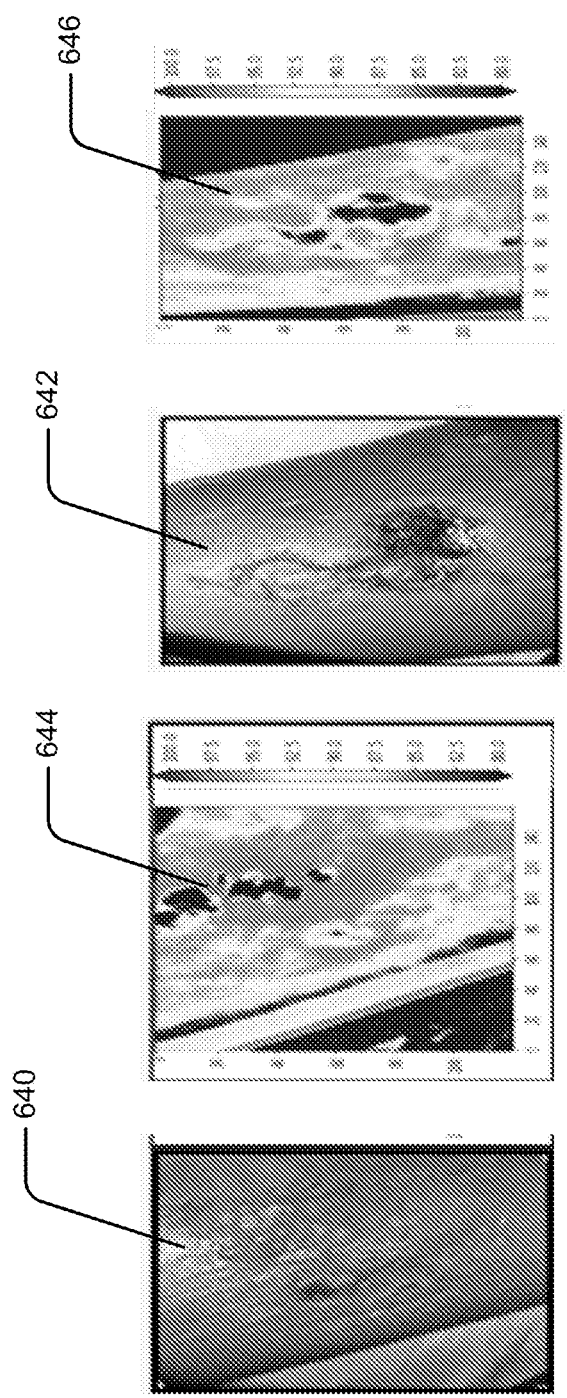

In an example, as depicted in FIG. 6(*d*), image 640 represents a white light image of a first patient having a wound and image 642 represents a white light image of a second patient having a wound. Further, images 644 and 646 may represent result of oxygen saturation level at each pixel of the wound of the first and the second patient respectively. As will be understood, the analysis model 114 may be used to obtain the images 644 and 646.

The device 100 may also provide outputs usable to understand wound stiffness. The wound stiffness may be obtained by analyzing the white light images of the target 102.

In an implementation, the device 100 may be used to detect callus on a human body part, such as a hand or a foot. For this, the analysis model 114 may be trained with several reference white light images of human body parts, where some of the body parts have callus and some do not.

In an implementation, the device 100 may include a three-dimensional (3D) depth sensor that may capture an image of the target 102 and may also provide information on depths of various entities captured in the image. The depth information can be used to determine a depth of the wound in the target. The 3D depth sensor may determine the depths of the various entities by using structured light illumination, time-of-flight sensing technique, stereoscopy technique, or the like.

Figure 7A:
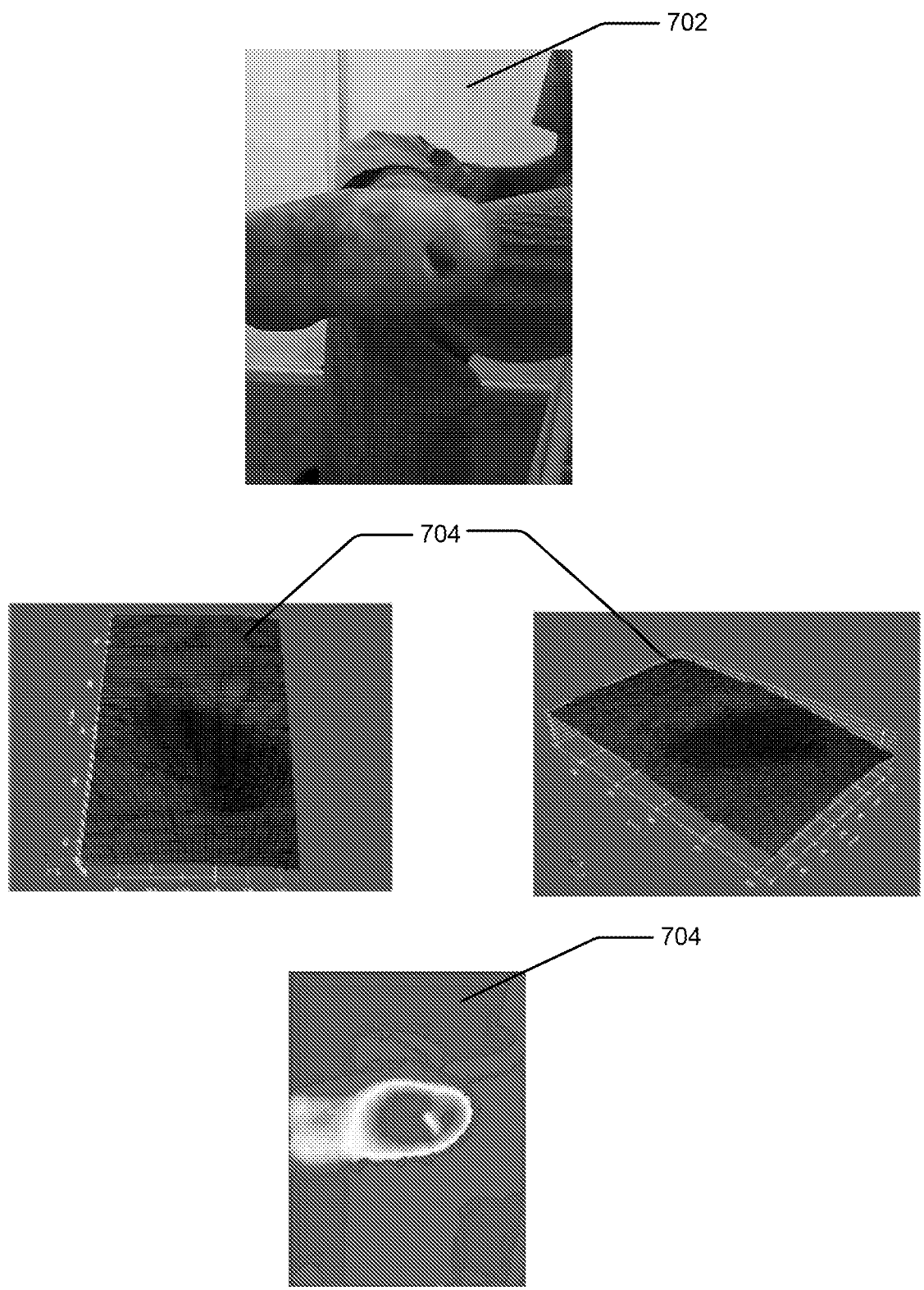
FIG. 7(a) illustrates a white light image and a corresponding 3D depth image of a human leg with a wound, in accordance with an implementation of the present subject matter.

FIG. 7(*a*) illustrates a white light image 702 and a corresponding 3D depth image 704 of a human leg with a wound, in accordance with an implementation of the present subject matter. As illustrated, the 3D depth image 704 provides information of the depths of various entities captured in the image 704. For instance, entities at similar depths are displayed in the same color, while entities at different depths are displayed in different colors.

FIG. 7(*b*) illustrates a fluorescence image 706 of a human leg superimposed on the 3D image of the wound, in accordance with an implementation of the present subject matter. The image 606 may enable precise visualization of the fluorescence distribution at different depths.

Figure 8A:
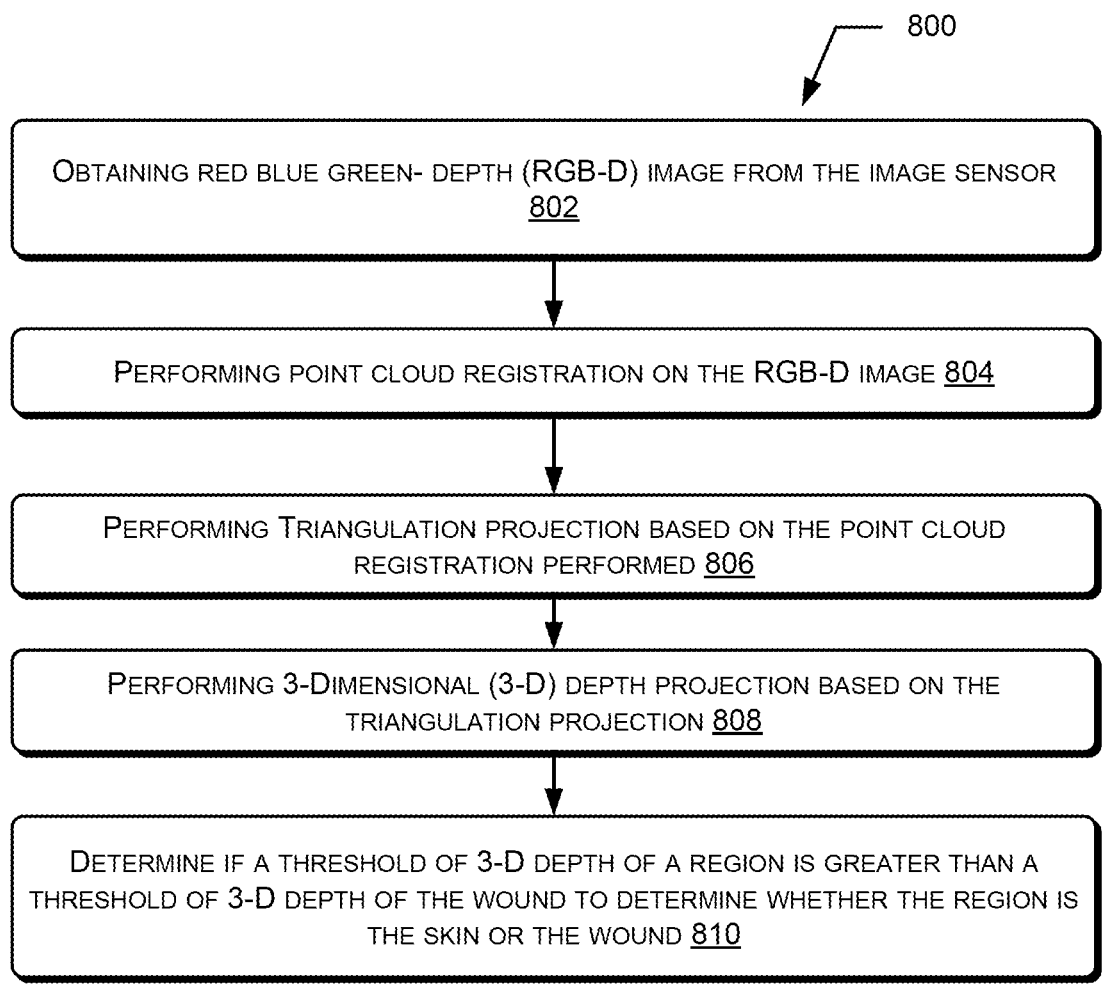
FIG. 8(a) illustrates a method for detecting whether a portion illustrated in a 3D image is wound or skin, in accordance with an implementation of the present subject matter.
Figure 8B:
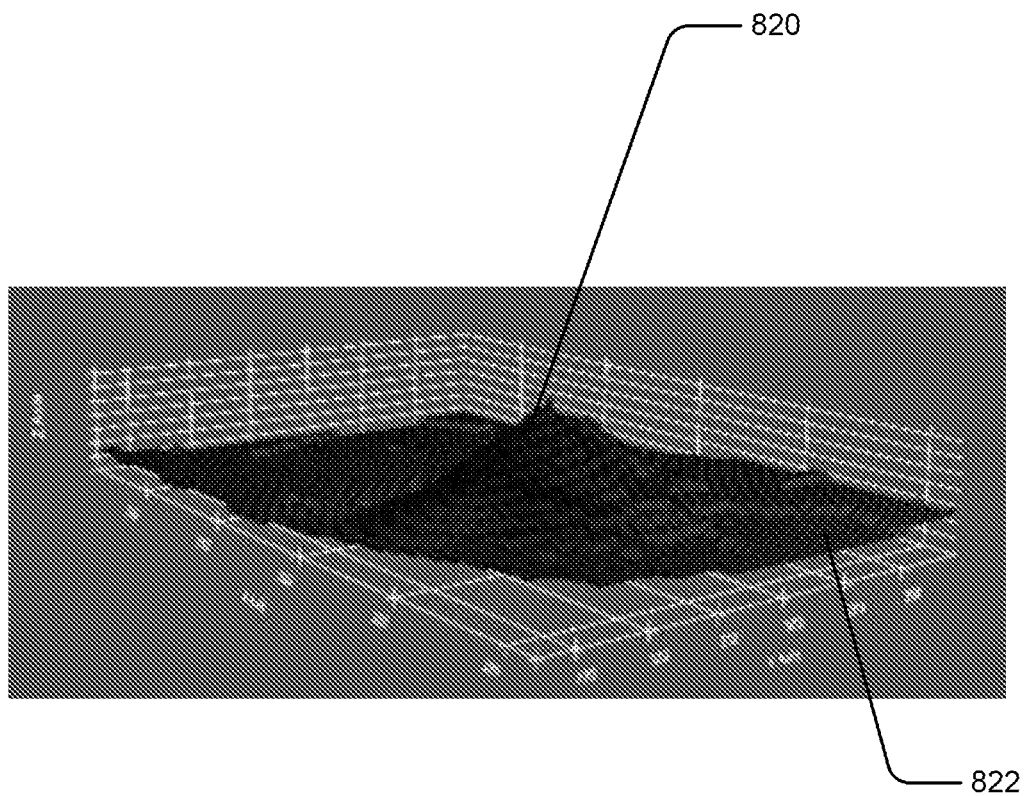
FIG. 8(b) illustrates detection of whether a portion illustrated in a 3D image is a wound or a skin, in accordance with an implementation of the present subject matter.

FIG. 8(*a*) illustrates a method 800 for detecting whether a portion illustrated in a 3D image is wound or skin, in accordance with an implementation of the present subject matter. The order in which the method blocks are described is not included to be construed as a limitation, and some of the described method blocks can be combined in any order to implement the method 800, or an alternative method. Additionally, some of the individual blocks may be deleted from the method 800 without departing from the scope of the subject matter described herein.

At block 802, red green blue-depth (RGB-D) image may be obtained from the image sensor. The image may be an image of the portion where it is to be determined whether the portion illustrated is a wound or a skin. For instance, 3-D depth camera may be used for obtaining the RGB-D image. Subsequently, at block 804, point cloud registration on the RGB-D image may be performed. The point cloud registration is a process of finding a spatial transformation, such as scaling, rotation, and translation, that aligns two point clouds, i.e., two sets of data points that corresponds to the RGB-D image.

At block 806, triangulation projection may be performed based on the point cloud registration to determine points in 3D space. Further, at block 808, 3-D depth projection may be performed based on the triangulation projection. Subsequently, at block 810, it may be determined if a threshold of 3-D depth of a region is greater than a threshold of 3-D depth of the wound to determine whether a region is skin or the wound. For instance, if a threshold of the 3-D depth of a region is greater than a threshold of 3-D depth of the wound, then the region may be determined as the wound. Similarly, if a threshold of the 3-D depth of a region is lesser than a threshold of 3-D depth of the wound, then the region may be determined as the skin. The 3-D depth may be obtained from the 3-D depth projection performed in block 808. In an example, various machine learning and deep learning techniques may be used to classify and segment the wound region into different types, such as slough, bone, tendon, granulation, and the like. The determination of the wound and the skin region is depicted in FIG. 8(*b*).

FIG. 8(*b*) illustrates detection of whether the portion illustrated in a 3D image is a wound or a skin, in accordance with an implementation of the present subject matter. Region 820 is portion where the threshold of 3-D depth is determined to be greater than the threshold of the wound. Therefore, region 820 is detected to be wound. Region 822 is a portion where the threshold of 3-D depth is determined to be lesser than the threshold of the wound. Therefore, region 822 is determined to be skin.

The device 100 can be used to detect and classify pathogens present on a steel surface as will explained below.

Figure 9:
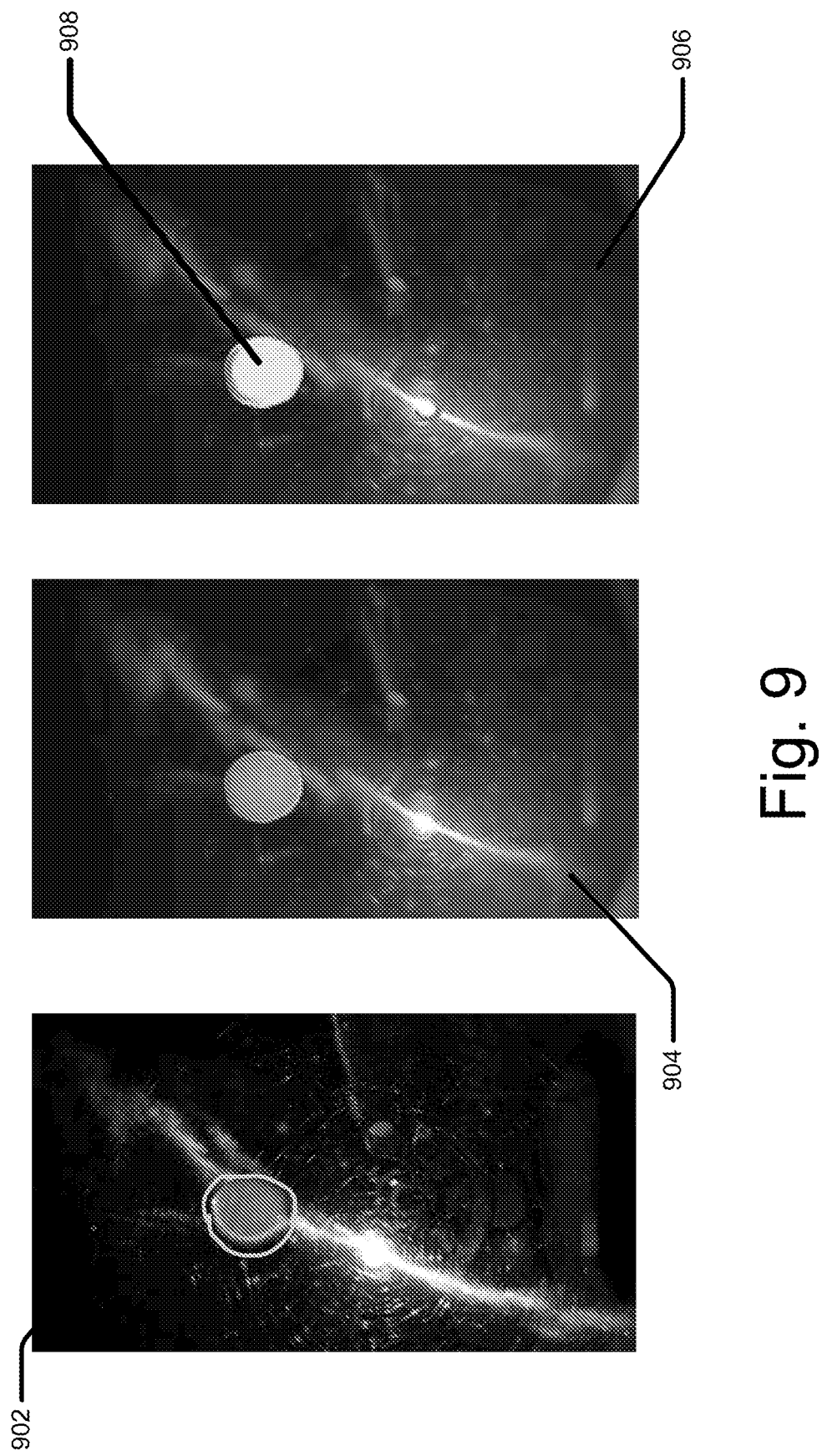
FIG. 9 illustrates detection of presence of pathogens on a steel surface, in accordance with an implementation of the present subject matter.

FIG. 9 illustrate the detection of the presence of pathogens on a steel surface, in accordance with an implementation of the present subject matter. Image 902 is a white light image of a steel surface having a pathogen. Image 904 is a fluorescence-based image of steel surface captured when illuminated with a light of 395 nm wavelength. Image 906 is a spatially overlaid color image that is obtained after implementation of the ML model. Region 908 is identified as the region having the presence of the pathogen. In addition, the gram type of the pathogen is also identified.

Figure 10:
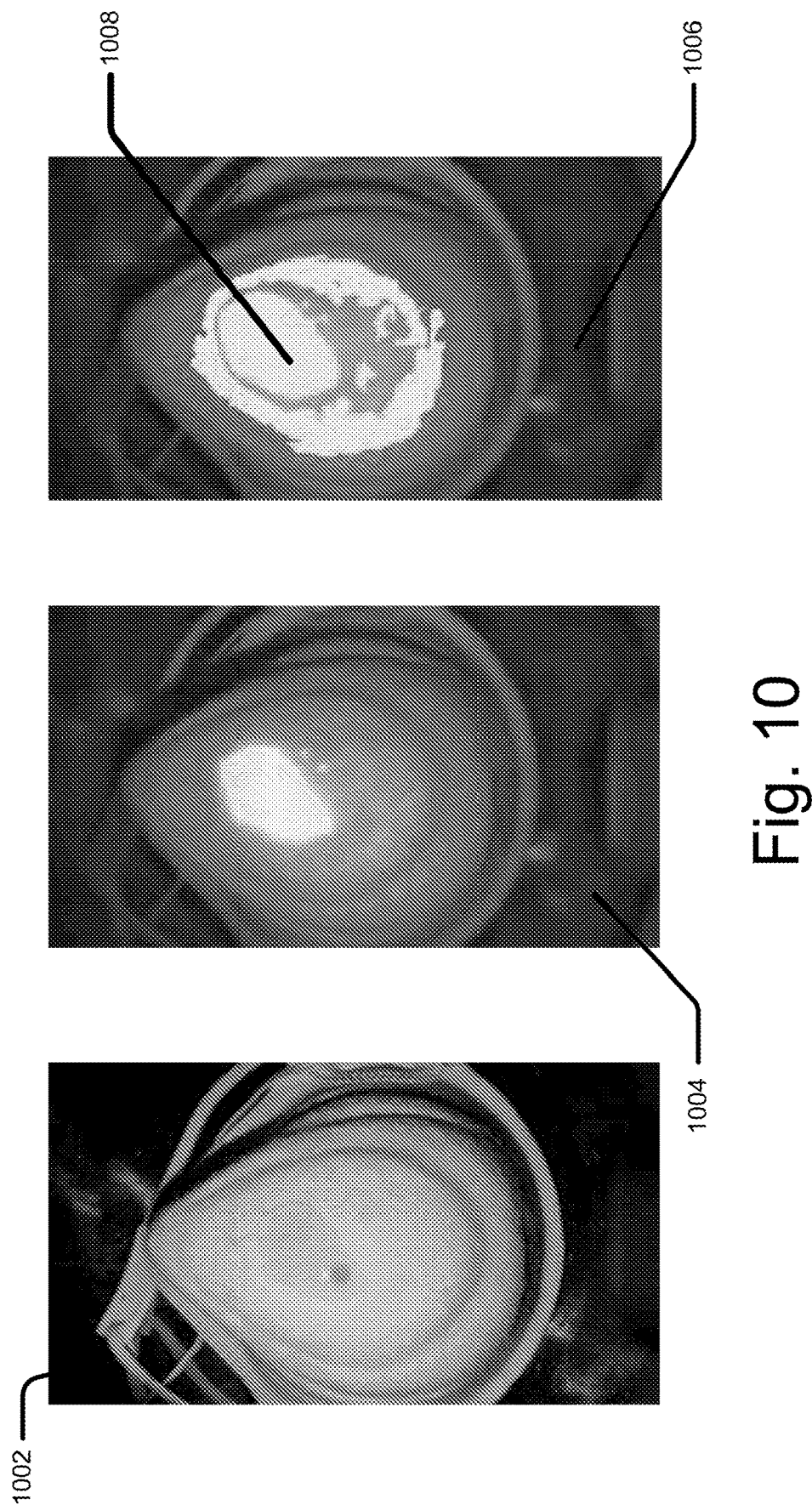
FIG. 10 illustrates detection of presence of pathogens on a mask, in accordance with an implementation of the present subject matter.

FIG. 10 illustrates the detection of the presence of pathogens on a mask, in accordance with an implementation of the present subject matter. Image 1002 is a white light image of the mask, such as a N95 mask, having a pathogen. Image 1004 is a fluorescence-based image of the N95 mask captured when illuminated with a light of 395 nm wavelength. Image 1006 is a spatially overlaid color image that is obtained after implementation of the ML model. Region 1008 is identified as the region having the presence of the pathogen. In addition, the gram type of the pathogen is also identified.

Figure 11:
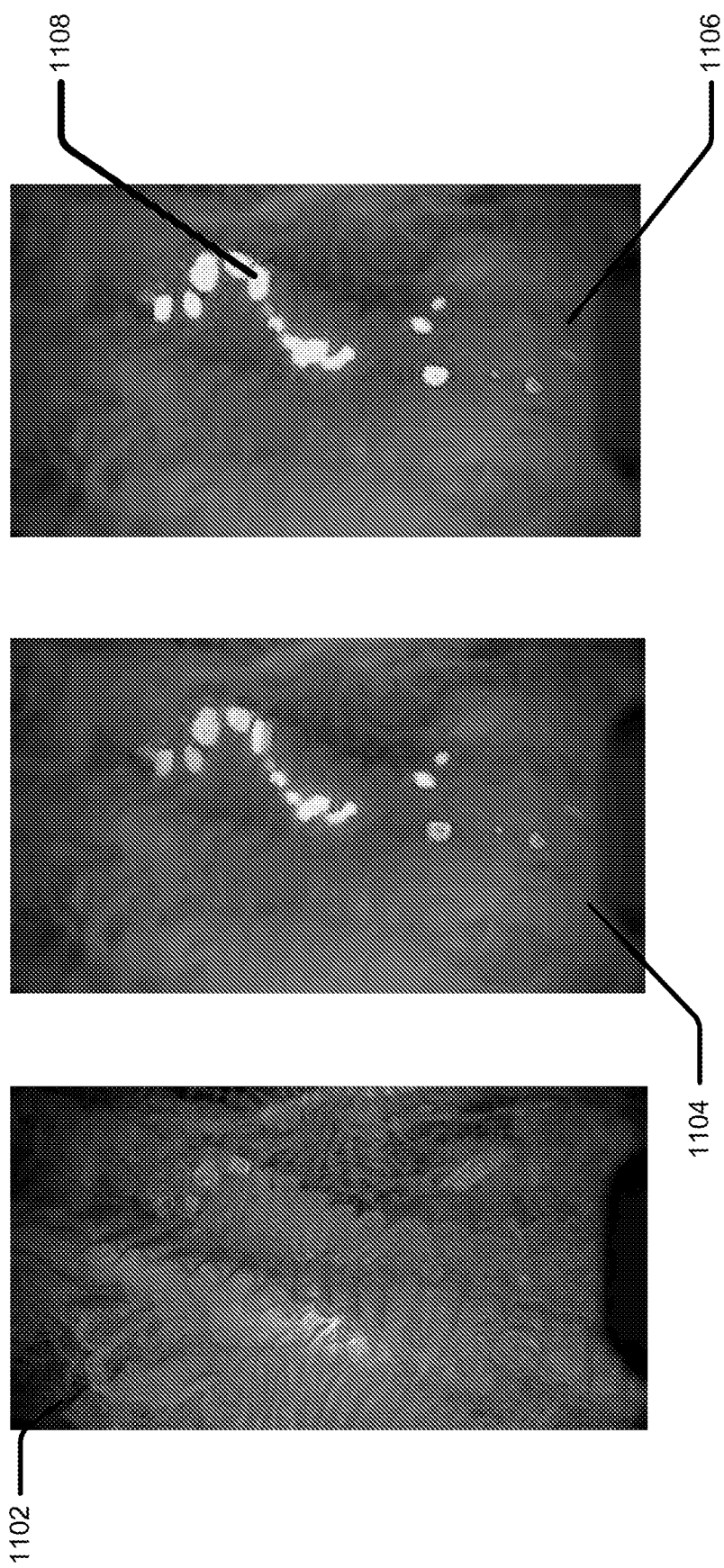
FIG. 11 illustrates detection of presence of pathogens on a head cap, in accordance with an implementation of the present subject matter.
Figure 12:
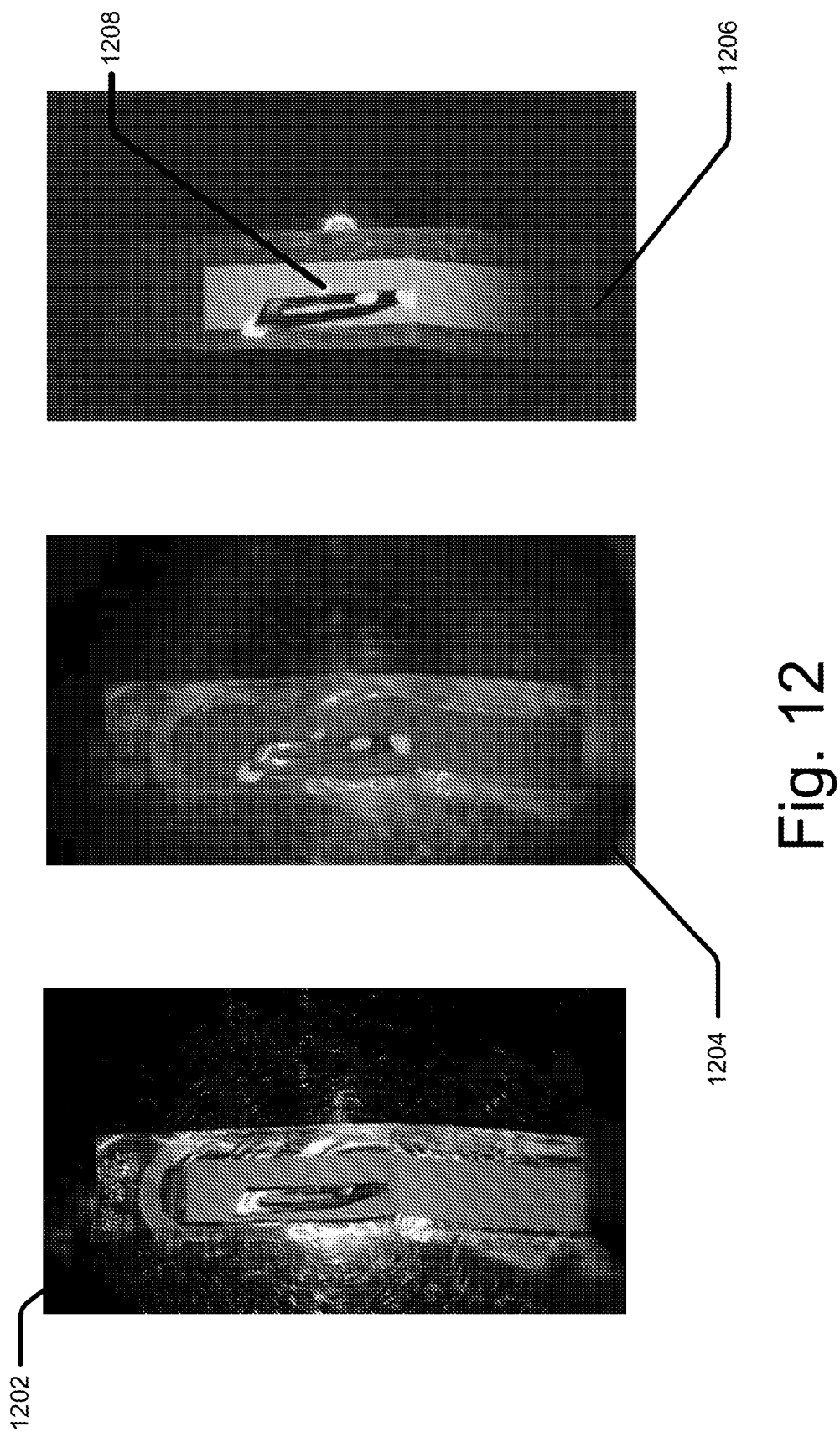
FIG. 12 illustrates detection of presence of pathogens on a surgical blade, in accordance with an implementation of the present subject matter.

FIGS. 11 and 12 illustrate the detection of the presence of pathogens on a head cap and a surgical blade, in accordance with an implementation of the present subject matter. Images 1102, 1202 are white light images of the head cap and the surgical blade respectively having a pathogen.

Images 1104, 1204 are fluorescence-based images of the head cap and the surgical blade respectively captured when illuminated with a light of 395 nm wavelength. Images 1106, 1206 are spatially overlaid color images that are obtained after implementation of the ML model. Region 1108, 1208 are identified as the region having the presence of the pathogen in the head cap and the surgical blade respectively. In addition, the gram type of the pathogen is also identified.

In an implementation, the device 100 may include a thermal sensor for thermal imaging of a wound, and for determining temperature distribution of a wound, as will be described below.

Figure 13:
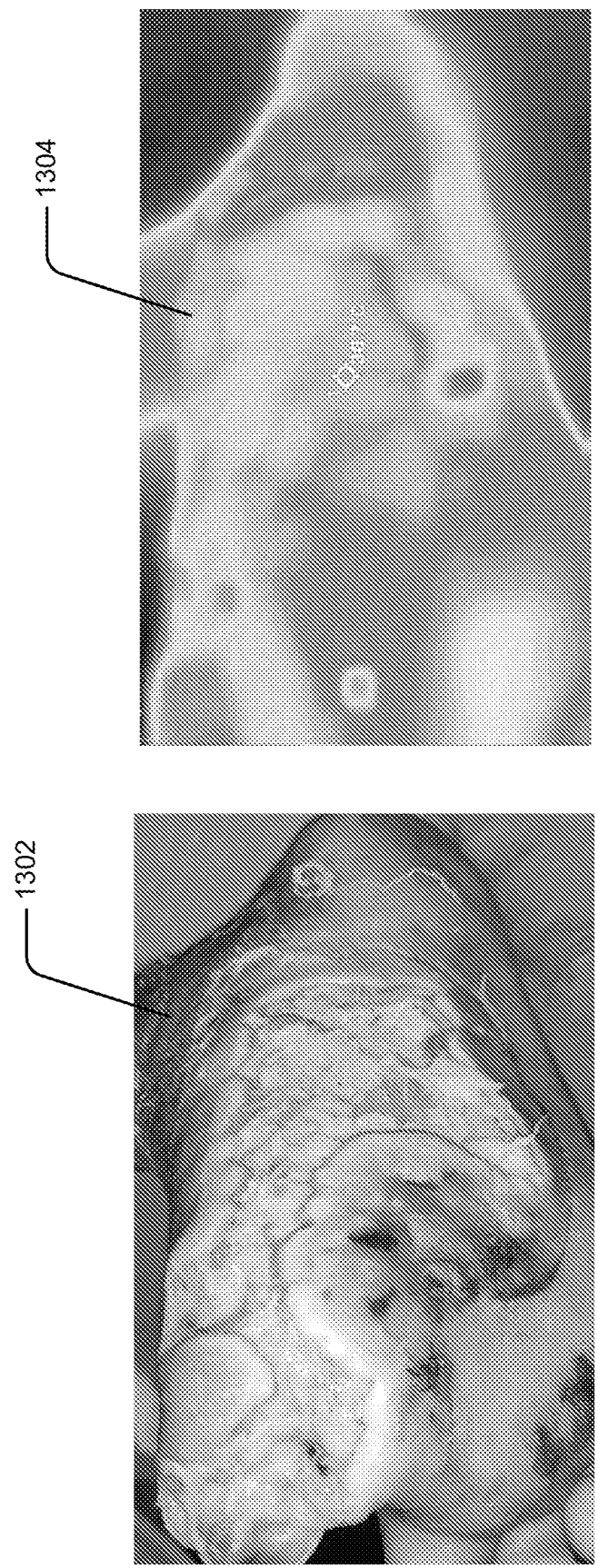
FIG. 13 illustrates results of thermal imaging of a wound, in accordance with an implementation of the present subject matter.

FIG. 13 illustrates results of thermal imaging of a wound, in accordance with an implementation of the present subject matter. Image 1302 is a white light image of the foot having a wound. Image 1304 is a thermal imaging of the wound obtained from the thermal sensor. Each color or each shade in the image 1304 represents a particular temperature. From the image 1304, blood flow at a particular region can be detected. For instance, from the image 1304, if it is detected that the temperature at a particular region is higher, then the blood flow at that region is higher and if the temperature at a particular region is lower, then the blood flow at that region is lower. Further, in an example, the thermal imaging may be used in combination with other images, such as white light images, fluorescent-based images, to better understand wound bioburden (i.e., number of pathogens on the wound). Although, in the above explanation, all the steps involved in detection and classification of pathogens are explained as being performed in the device 100, in some examples, some of the steps may be performed in a different device, also referred to as a processing device.

Figure 14:
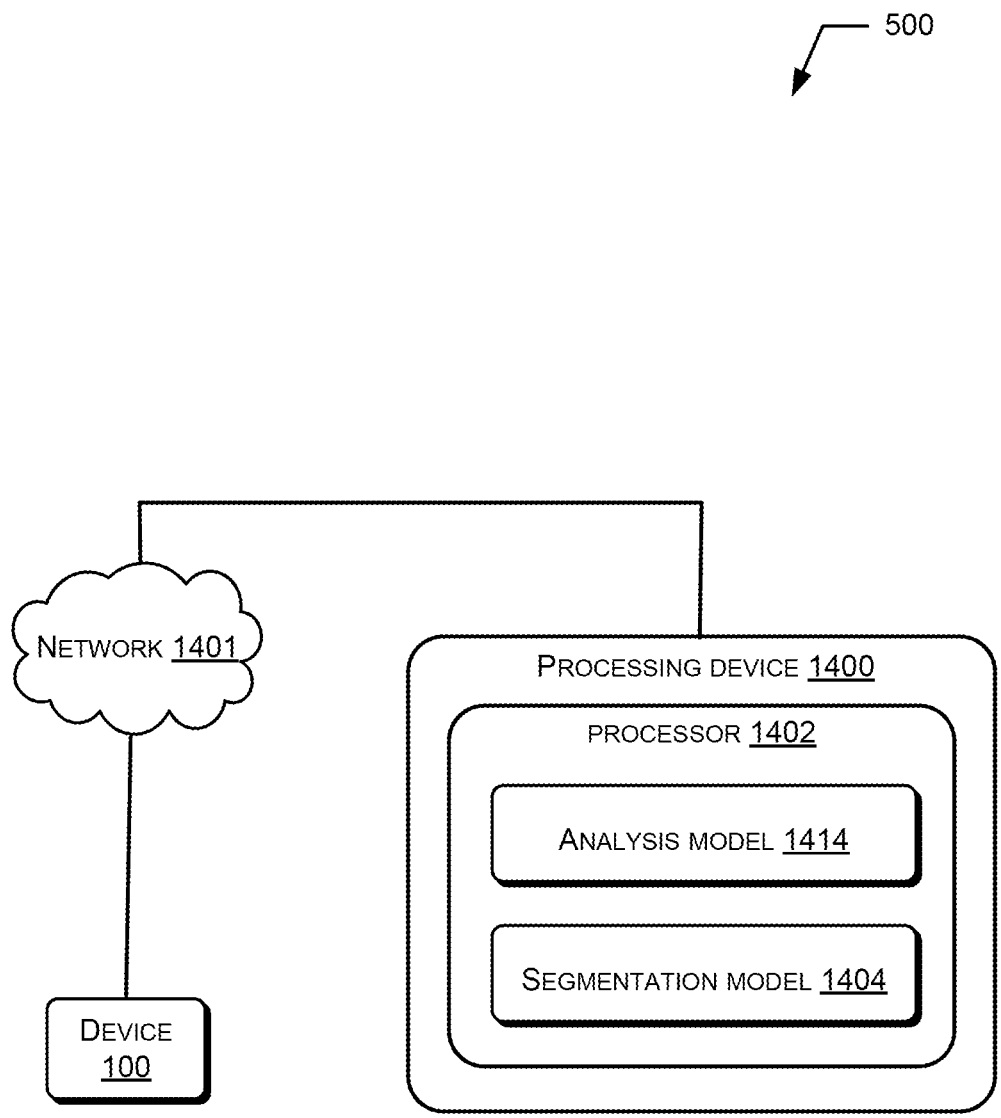
FIG. 14 illustrates a device connected to a processing device, in accordance with an implementation of the present subject matter.

FIG. 14 illustrates the device 100 connected to a processing device 1400, in accordance with an implementation of the present subject matter. The processing device 1400 may be a computing device, such as a server, provided at a remote location, such as on the cloud. The processing device 1400 may include computer(s), servers(s), cloud device(s) or any combination thereof. The device 100 may be connected to the processing device 1400 over a communication network 1401. In accordance with the implementation, the analysis model 1414, which is used for detecting the presence of pathogens based on the processing of fluorescence-based images and white light images, may be implemented on the processing device 1400. The analysis model 1414 may correspond to the analysis model 114. The processing device 1400 may include a processor 1402 that implements the analysis model 1414. Accordingly, the device 100 may capture the fluorescence-based images and white light images of a target and may transmit them to the processing device 1400. Upon detecting and classifying the pathogens, the processing device 1400 may transmit the result of the analysis to the device 100, which may then display the result on the display 122 (not shown in FIG. 14).

In an implementation, the device 100 may perform the wound segmentation on the white light images being sent, and the processing device 1400 may then perform the pathogen detection and classification on the wound. For performing the wound segmentation, the device 100 may implement a segmentation model 1404. The segmentation model 1404 may be an ANN model or an ML model that is trained to perform the wound segmentation.

Figure 15:
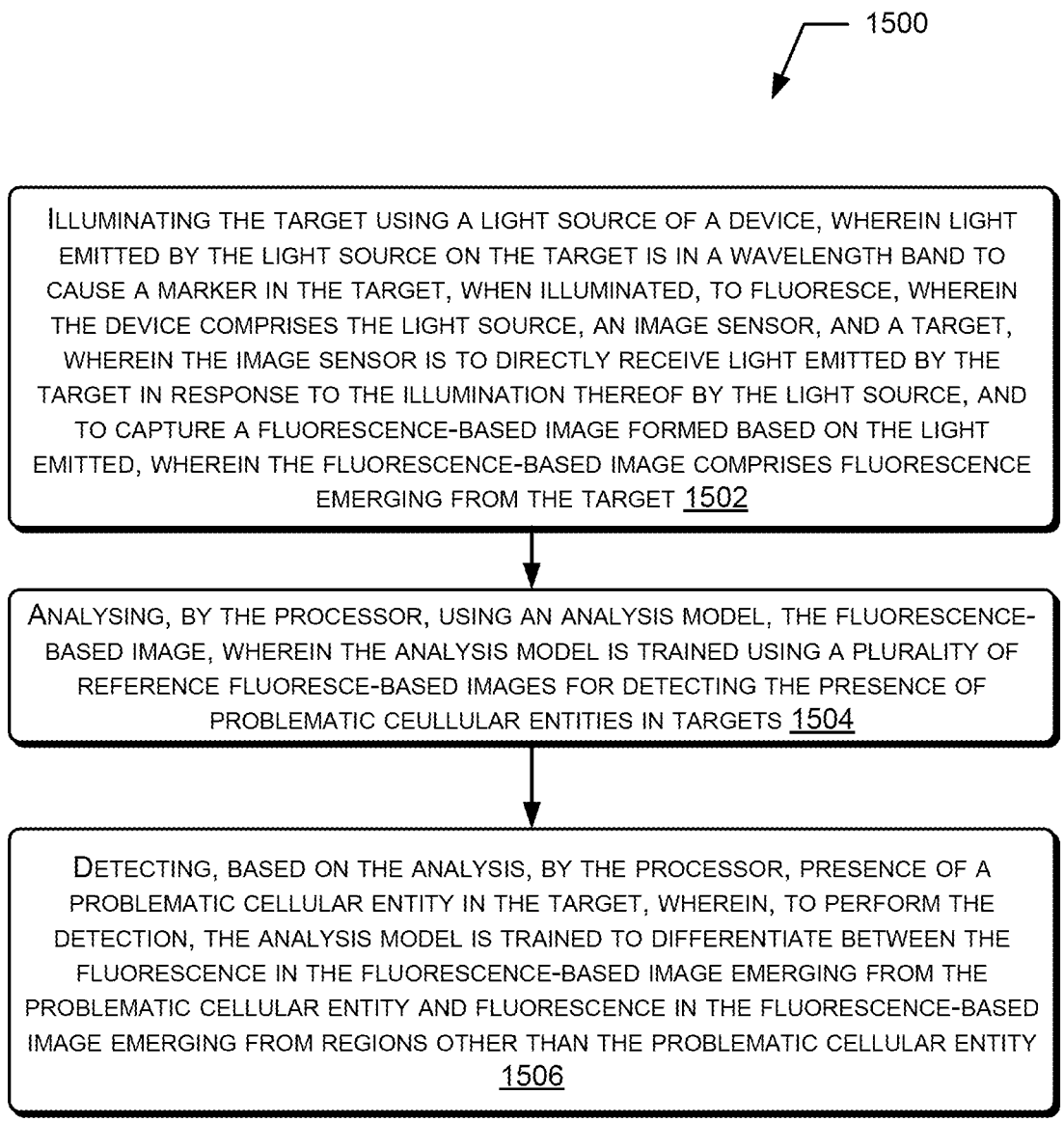
FIG. 15 illustrates a method for examining a target, in accordance with an implementation of the present subject matter.

FIG. 15 illustrates a method for examining a target, in accordance with an implementation of the present subject matter. The order in which the method blocks are described is not included to be construed as a limitation, and some of the described method blocks can be combined in any order to implement the method 1500, or an alternative method. Additionally, some of the individual blocks may be deleted from the method 1500 without departing from the scope of the subject matter described herein. The target may correspond to the target 102.

At block 1502, the target may be illuminated using a light source of a device. The light emitted by the light source on the target may be a wavelength band to cause a marker in the target, when illuminated, to fluoresce. The device comprises the light source, an image sensor, and a processor. The image sensor may directly receive light emitted by the target in response to the illumination thereof by the light source. The image sensor may capture a fluorescence-based image formed based on the light emitted. The fluorescence-based image may include fluorescence emerging from the target. The device may correspond to the device 100. The light source may correspond to the first light source 104. The image sensor may correspond to the image sensor 108 and the processor may correspond to the processor 112.

At block 1504, the fluorescence-based image may be analysed by the processor using an analysis model. The analysis model may be trained using a plurality of reference fluorescence-based images for detecting the presence of problematic cellular entities in targets. In an example, in addition to the reference fluorescence-based images, the analysis may model may be trained using a plurality of reference white light images. The analysis model may correspond to the analysis model 114.

At block 1506, presence of a problematic cellular entity in the target may be detected by the processor based on the analysis. To perform the detection, the analysis model may be trained to differentiate between the fluorescence in the fluorescence-based image emerging from the problematic cellular entity and the fluorescence in the fluorescence-based image emerging from regions other than the problematic cellular entity.

In an example, the target may be an edible product, a laboratory equipment, a sanitary device, a sanitary equipment, a biochemical assay chip, or a microfluidic chip. The problematic cellular entity may be a pathogen. Further, the method 1500 may include identifying, by the processor, location of the target in the fluorescence-based image using the analysis model. Presence of the pathogen in the target may be detected by the processor using the analysis model. The pathogen present in the target may classified by the processor using the analysis model.

The present subject matter utilizes an analysis model that is trained over several reference fluorescence-based images for detecting the presence of problematic cellular entity in the target. In addition, in an example, the analysis model may be trained over several reference white light images may be used to initially differentiate the regions, such as a wound region, a bone region, and the like. Subsequently, the analysis model may be trained over several reference fluorescence-based images for detecting the presence of the problematic cellular entity in the target, thereby increasing the accuracy of the detection. In an example, the analysis model may also be deployed on one or more computers or servers or cloud systems or combinations thereof for training using techniques, such as federated learning in order to improve the accuracy. The analysis model may ignore the background light and excitation light in the fluorescence-based image, and may pick up the weak fluorescence information in the fluorescence-based image. Thus, the present subject matter eliminates the use of an emission filter for filtering the background light and excitation light. Thus, the device of the present subject matter is simple and cost-effective.

Thus, the present subject matter provides a rapid, filter-less, non-invasive, automatic, and in-situ detection and classification of pathogens using an "opto-computational biopsy" technique.

The present subject matter can be used for detecting the presence of problematic cellular entities in diabetic foot ulcers, surgical site infections, burns, skin, and interior of the body, such as esophagus, stomach, and colon. The device of the present subject matter can be used in the fields of dermatology, cosmetology, plastic surgery, infection management, photodynamic therapy monitoring, and anti-microbial susceptibility testing.

The present subject matter can be used for detecting problematic cellular entities using fluorescence from exogenous fluorescence markers. For instance, the exogenous marker may bind to cellular entities, such as deoxyribonucleic acid (DNA), Ribonucleic acid (RNA), proteins, biochemical markers, and the like, which may cause the target to fluoresce.

Although the present subject matter has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter.

The invention claimed is:

1. A device for examining a target, the device comprising:
   a first light source for emitting light for illuminating the target that causes a marker in the target to fluoresce;
   an image sensor configured to directly receive light emitted by the target in response to the illumination thereof by the first light source without an optical bandpass filter being disposed between the image sensor and the target, and to capture a fluorescence-based image formed based on the light emitted, wherein the fluorescence-based image comprises fluorescence emerging from the target;
   a thermal sensor configured to obtain a thermal image of the target, wherein the thermal image comprises thermal radiation emerging from the target; and
   a processor configured to:
   analyze, using an analysis model, the fluorescence-based image and the thermal image; and
   detect, using the analysis model, presence of a problematic cellular entity in the target based on the analysis of the fluorescence-based image and the thermal image, wherein the analysis model is trained for detecting the presence of problematic cellular entities in targets.

2. The device of claim 1, wherein the analysis model is trained using a plurality of reference fluorescence-based images for detecting the presence of problematic cellular entities in targets and wherein the analysis model is trained to differentiate between fluorescence in the fluorescence-based image emerging from the problematic cellular entity and fluorescence in fluorescence-based image emerging from regions of other than the problematic cellular entity.

3. The device of claim 1, comprising a second light source for emitting light for illuminating the target without causing the marker in the target to fluoresce, wherein the second light source is operable to emit light in one of: visible light or a near-infrared wavelength range for illuminating the target, and wherein the image sensor is configured to directly receive light reflected by the target in response to the illumination thereof by the second light source, and to capture an image formed based on the light reflected, and wherein, using the analysis model, the processor is operable to:
   analyze the image of the target, in response to the illumination thereof by the second light source, to detect oxygenation at a plurality of regions in the target; and
   detect, using the analysis model, the presence of a problematic cellular entity in the target based on the analysis of the fluorescence-based image, the thermal image, and the detected oxygenation at the plurality of regions of the target.

4. The device of claim 3, wherein the target is a tissue, and wherein the identified oxygenation corresponds to tissue oxygenation, and wherein the tissue oxygenation comprises total hemoglobin content, oxy-hemoglobin content, de-oxy hemoglobin content, oxygen saturation, blood perfusion, or any combination thereof.

5. The device of claim 3, wherein the target is a wound region, wherein the problematic cellular entity is a pathogen, and wherein when using the analysis model, the processor is configured to:
   identify abnormalities in the oxygenation at the plurality of regions in the target based on the detected oxygenation;
   identify a location of the wound region based on the fluorescence-based image the thermal image, and the detected oxygenation;
   detect presence of the pathogen in the wound region; and
   track healing of the wound region, pathogen load change, and changes in the oxygenation in the wound region.

6. The device of claim 1, wherein the target is a wound, and wherein the processor is operable to:
   determine, using the analysis model, a wound bioburden based on the analysis of the fluorescence-based image and the thermal image.

7. The device of claim 1, comprising a smartphone, wherein the smartphone comprises:
   the processor;
   the image sensor; and
   the thermal sensor.

8. The device of claim 1, wherein the target is a tissue or a tissue sample, and wherein the processor is configured to detect the presence of at least one of: a cancerous tissue and a necrotic tissue in the tissue sample.

9. The device of claim 1, wherein the analysis model comprises an Artificial Neural Network (ANN) model, a Machine Learning model (ML), or a combination thereof.

10. The device of claim 1, wherein the target is a wound region, wherein the problematic cellular entity is a pathogen, and wherein when using the analysis model, the processor is configured to:
    identify a location of the wound region based on the fluorescence-based image and the thermal image;
    detect presence of the pathogen in the wound region; and
    track healing of the wound region and pathogen load change in the wound region.

11. The device of claim 1, wherein the target is a wound region, wherein the problematic cellular entity is a pathogen, and wherein when using the analysis model, the processor is configured to:
    identify a location of the wound region based on the fluorescence-based image and the thermal image;
    detect presence of the pathogen in the wound region; and
    detect status of inflammation of the wound region.

12. The device of claim 1, wherein the processor is configured to:
deduce, using the analysis model, blood flow at a plurality of regions of the target based on the thermal image; and
detect, using the analysis model, presence of a problematic cellular entity in the target based on the analysis of the fluorescence-based image and based on the deduction of the blood flow at the plurality of regions of the target.

13. The device of claim 1, wherein the processor is operable to:
deduce, using the analysis model, blood flow at a plurality of regions of the target based on the thermal image; and
track, using the analysis model, changes in severity of the problematic cellular entity based on the analysis of the fluorescence-based image and based on the deduction of the blood flow at the plurality of regions of the target.

14. The device of claim 1, wherein the processor is operable to:
detect, using the analysis model, blood flow at a plurality of regions of the target based on the thermal image; and
determine, using the analysis model, a disease prognosis based on the analysis of the fluorescence-based image and based on the detection of the blood flow at the plurality of regions of the target.

15. The device of claim 1, wherein the problematic cellular entity is a pathogen, wherein the processor is configured to determine at least one of: gram type, family, genus, species, and strain of the pathogen in the wound region based on the analysis of the first image.

16. The device of claim 1, comprising a white light source for emitting light for illuminating the target without causing the marker in the target to fluoresce, wherein the white light source is operable to emit white light, and wherein the image sensor is configured to:
directly receive light reflected by the target in response to the illumination thereof by the white light source; and
capture a white-light based image formed based on the light received, and
wherein, using the analysis model, the processor is:
configured to detect the presence of an anomaly in the target based on analysis of the white-light image.

17. The device of claim 1, comprising:
a white light source for emitting light for illuminating the target without causing the marker in the target to fluoresce, wherein the white light source is operable to emit white light, and
a second light source for emitting light for illuminating the target without causing the marker in the target to fluoresce, wherein the second light source is operable to emit light in one of: visible light or a near-infrared wavelength range for illuminating the target,
wherein the image sensor is configured to:
directly receive light reflected by the target in response to the illumination thereof by the second light source, and to capture an image formed based on the light reflected;
directly receive light reflected by the target in response to the illumination thereof by the white light source, and to capture a white-light based image formed based on the light received; and
wherein, using the analysis model, the processor is configured to:
analyze the image of the target captured in response to the illumination thereof by the second light source to detect oxygenation at a plurality of regions in the target;
analyze the white-light image; and
detect the presence of an anomaly in the target based on analysis of the fluorescence-based image, the thermal image, the white-light image, and the detected oxygenation at the plurality of regions in the target.

18. The device of claim 1, further comprising a three-dimensional (3D) depth sensor to determine depth of the plurality of regions in the target.

19. The device of claim 1, wherein the processor is configured to monitor, using the analysis model, photodynamic therapy based on the detection of the presence of the problematic cellular entity.

20. The device of claim 1, wherein the processor is configured to monitor effectiveness of surgical procedures based on the detection of the presence of the problematic cellular entity.

21. The device of claim 1, further comprising:
a first polarizer integrated with the first light source to let light waves of a specific polarization to pass through; and
a second polarizer integrated with the image sensor to let light waves of a specific polarization to pass through.

22. A system for examining a target, the system comprising:
a processor configured to:
receive a fluorescence-based image of the target and a thermal image of the target from a device coupled to the system, wherein the device comprises:
a first light source for emitting light for illuminating the target that causes a marker in the target to fluoresce;
an image sensor configured to directly receive light emitted by the target in response to the illumination thereof by the first light source without an optical bandpass filter being disposed between the image sensor and the target, and to capture the fluorescence-based image formed based on the light emitted, wherein the fluorescence-based image comprises fluorescence emerging from the target; and
a thermal sensor configured to obtain the thermal image of the target, wherein the thermal image comprises thermal radiation emerging from the target;
analyze, using an analysis model, the fluorescence-based image and the thermal image;
detect, using the analysis model, presence of a problematic cellular entity in the target based on the analysis of the fluorescence-based image and the thermal image, wherein the analysis model is trained for detecting the presence of problematic cellular entities in targets; and
transmit, to the device, a result corresponding to the detection.

23. The system of claim 22, wherein the analysis model is trained using a plurality of reference fluorescence-based images for detecting the presence of problematic cellular entities in targets and wherein the analysis model is trained to differentiate between fluorescence in the fluorescence-based image emerging from the problematic cellular entity and fluorescence in fluorescence-based image emerging from regions of other than the problematic cellular entity.

24. A method for examining a target, the method comprising:
illuminating the target using a first light source of a device, wherein the illumination is to cause a marker in the target to fluoresce;

capturing, by an image sensor of the device, a fluorescence-based image, wherein the image sensor is operable to directly receive light emitted by the target in response to the illumination thereof by the first light source without an optical bandpass filter being disposed between the image sensor and the target, wherein the fluorescence-based image is formed based on the light emitted by the target, and wherein the fluorescence-based image comprises fluorescence emerging from the target;

analyzing, by a processor of the device, a fluorescence-based image and a thermal image using an analysis model, wherein the fluorescence-based image comprises fluorescence emerging from the target in response to light emitted by the first light source, and wherein the thermal image comprises thermal radiation emerging from the target; and detecting, by the processor, presence of a problematic cellular entity in the target using the analysis model based on the analysis of the fluorescence-based image and the thermal image, wherein the analysis model is trained for detecting the presence of problematic cellular entities in targets.

25. The method of claim 24, wherein the analysis model is trained using a plurality of reference fluorescence-based images to differentiate between fluorescence in the fluorescence-based image emerging from the problematic cellular entity and fluorescence in fluorescence-based image emerging from regions of other than the problematic cellular entity.

26. The method of claim 24, comprising:
illuminating, by a second light source of the device, the target without causing the marker in the target to fluoresce;
illuminating, by a white light source of the device, the target without causing the marker in the target to fluoresce;
analyzing, by the processor, an image using the analysis model source to detect oxygenation at a plurality of regions in the target, wherein the image is captured based on light reflected by the target in response to the illumination thereof by the second light source using the analysis model;
analyzing, by the processor, a white-light image using the analysis model, wherein the white-light image is captured based on light received by the target in response to the illumination thereof by the white light source; and
detecting, by the processor, the presence of an anomaly in the target using the analysis model based on analysis of the fluorescence-based image, the thermal image, the white-light image, and the detected oxygenation at the plurality of regions in the target.

27. The method of claim 24, wherein the target is a wound region, wherein the problematic cellular entity is a pathogen, and wherein the method comprises:
identifying, by the processor, a location of the wound region using the analysis model based on the analysis of the fluorescence-based image and the thermal image using the analysis model;
detecting, by the processor, presence of the pathogen in the wound region using the analysis model; and
detecting, by the processor, status of inflammation of the wound region, healing of the wound region, and pathogen load change in the wound region using the analysis model.

28. The method of claim 24, comprising:
deducing, by the processor, blood flow at a plurality of regions of the target based on the thermal image using the analysis model; and
tracking, by the processor, changes in severity of the problematic cellular entity based on the analysis of the fluorescence-based image and based on the deduction of the blood flow at the plurality of regions of the target using the analysis model.

29. The method of claim 24, wherein the target is a wound region, wherein the problematic cellular entity is a pathogen, and wherein the method comprises:
illuminating, by a second light source of the device, the target without causing the marker in the target to fluoresce;
analyzing, by the processor, an image using the analysis model source to detect oxygenation at a plurality of regions in the target, wherein the image is captured based on light reflected by the target in response to the illumination thereof by the second light source using the analysis model;
identifying, by the processor, abnormalities in the oxygenation at the plurality of regions in the target based on the detected oxygenation using the analysis model;
identifying, by the processor, a location of the wound region based on the fluorescence-based image, the thermal image, and the detected oxygenation using the analysis model;
detecting, by the processor, presence of the pathogen in the wound region using the analysis model; and
tracking, by the processor, healing of the wound region, pathogen load change, and changes in the oxygenation in the wound region using the analysis model.

* * * * *